United States Patent [19]

Ishimura et al.

[11] Patent Number: 4,811,043
[45] Date of Patent: Mar. 7, 1989

[54] DATA TRANSMISSION SYSTEM FOR USE IN A CAMERA SYSTEM

[75] Inventors: Toshihiko Ishimura, Habikino; Norio Ishikawa; Yasuaki Akada, both of Osaka; Reiji Seki, Sakai; Nobuyuki Taniguchi, Nishinomiya, all of Japan

[73] Assignee: Minolta Camera Kabushiki Kaisha, Osaka, Japan

[21] Appl. No.: 27,216

[22] Filed: Mar. 10, 1987

[30] Foreign Application Priority Data

Mar. 11, 1986 [JP] Japan .................................. 61-54136

[51] Int. Cl.⁴ ...................... G03B 7/00; G03B 15/05; G03B 17/18; G06F 13/00
[52] U.S. Cl. .................... 354/412; 354/413; 354/471; 354/145.1; 364/900
[58] Field of Search ........... 354/412, 475, 286, 145.1, 354/413, 471, 465; 364/200 MS File, 900 MS File

[56] References Cited

U.S. PATENT DOCUMENTS

| | | | |
|---|---|---|---|
| 3,676,858 | 7/1972 | Finch et al. | 364/200 |
| 3,836,888 | 9/1974 | Boenke et al. | 364/200 |
| 3,950,735 | 4/1976 | Patel | 364/200 |
| 4,052,702 | 10/1977 | Smith et al. | 364/200 |
| 4,149,795 | 4/1979 | Sakurada et al. | 354/475 |
| 4,378,588 | 3/1983 | Katzman et al. | 364/200 |
| 4,481,574 | 11/1984 | DeFino et al. | 364/200 |
| 4,494,196 | 1/1985 | Greer | 364/200 |
| 4,537,487 | 8/1985 | Taniguchi et al. | 354/286 X |
| 4,621,914 | 11/1986 | Taniguchi et al. | 354/21 |
| 4,637,704 | 1/1987 | Ishimura et al. | 354/286 |

FOREIGN PATENT DOCUMENTS 60-28634 2/1985 Japan .

OTHER PUBLICATIONS

Misubishi M50745, "Single-Chip 8-Bit CMOS Microcomputer".
Microcomputer Dictionary and Guide, by Charles J. Sippl, 1975, pp. 414 and 415.

Primary Examiner—W. B. Perkey
Attorney, Agent, or Firm—Burns, Doane, Swecker & Mathis

[57] ABSTRACT

In a data transmission system for a camera, a central processing unit (CPU) for controlling operation of the camera communicates with various circuit arrangements using data signals in a serial form under control of a clock signal selected in dependence upon which the circuit arrangement is the communication designation of the CPU at the time. Some of the circuit arrangements are provided in the camera while the other of the circuit arrangements are provided in accessories attachable to the camera. The CPU communicates with the circuit arrangements provided in the camera under control of a clock signal having a higher frequency for increasing the data communication speed while it communicates with the circuit arrangements provided in the accessories under control of a clock signal having a slower frequency for improving the accuracy of the data communication.

12 Claims, 14 Drawing Sheets

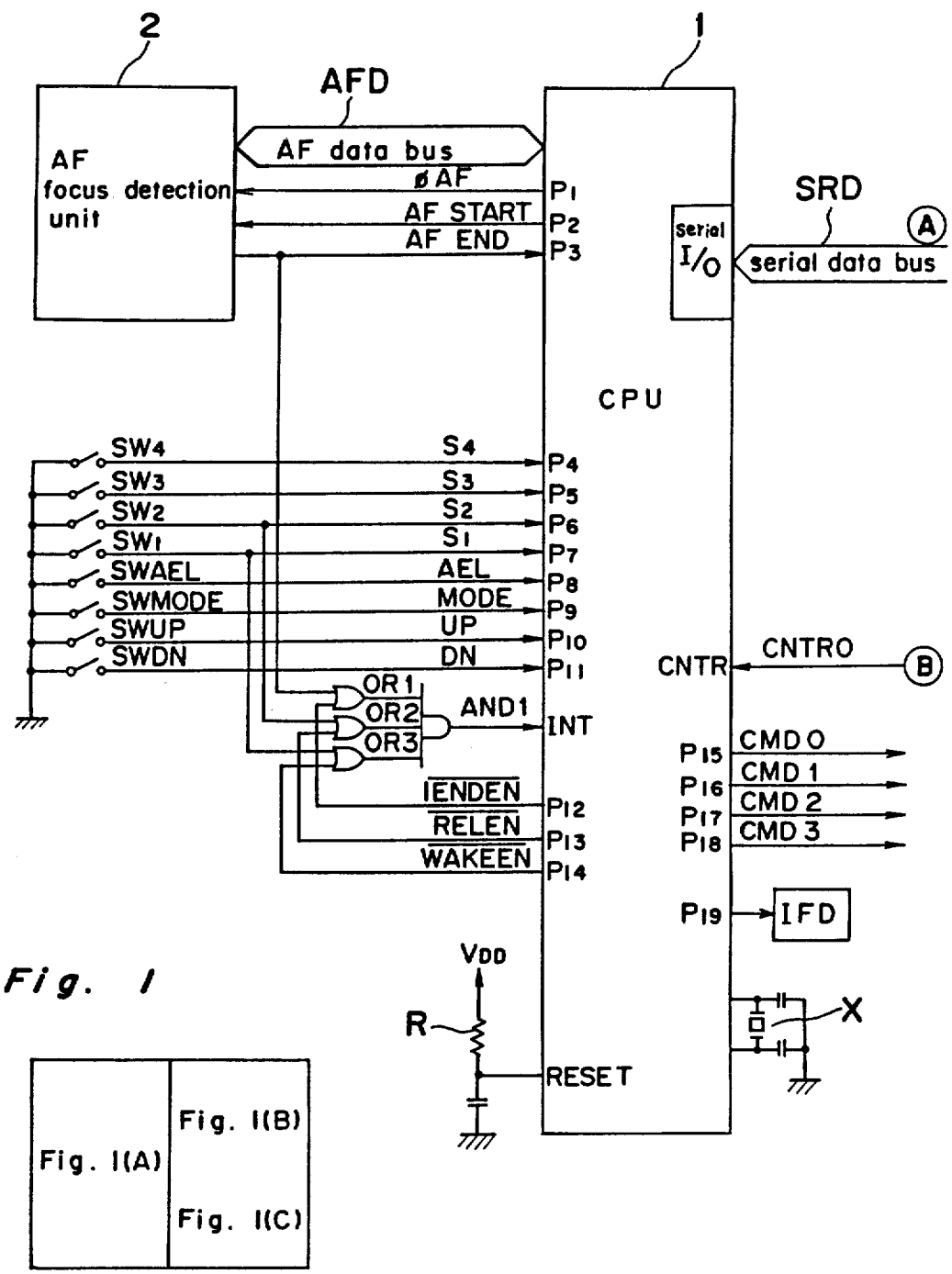

DATA TRANSMISSION SYSTEM FOR USE IN A CAMERA SYSTEM

BACKGROUND OF THE INVENTION

1. Field of the Invention

The present invention relates to a signal transmission system for use in a camera.

2. Description of the Prior Art

In a camera adopting a central processing unit referred to as CPU made of a microcomputer and one or more IC (integrated circuit) chips for controlling the sequential operation of various peripheral units for a film winding operation, lens shifting operation for an automatic focusing control or the like, there are usually used data signals in a serial form for the communication between CPU and IC chips of the various peripheral equipment. However, because of the data signals being in a serial form it takes a very long time for the transmission of the data signals, so that there is a defect that a high speed data process is impossible, resulting in difficulty in high speed data processing for controlling the peripheral equipment. In case of adopting SLR (single lens reflex) system, data communication of CPU with various kinds of accessories attached to the camera is necessary. For example, in case a flash device is used in a position apart from the camera, because of using an extending cable between the camera and flash device, there occurs a delay of the data transmission and the data signals may not be transmitted correctly in case the clock pulses for controlling the data transmission are fast.

In personal computers, the transmission clock can be switched at the computer depending on the ability of a printer connected to the computers. However, the communication destination of one computer is limited to one position i.e., one printer, so that it is impossible to adapt this data transmission system to a camera having a plurality of data destinations. Also there is a commercially available one chip microcomputer of variable transmission speed, (M 50745 manufactured by Mitsubishi Electric Corporation, Japan) in which the data transmission speed can be changed by switching the transmission clock at the serial input and output port or I/O port of the microcomputer. However, a catalogue introducing the microcomputer does not mention about how to adapt it to a camera having a plurality of data designations.

SUMMARY OF THE INVENTION

An essential object of the present invention is to provide a data transmission system for use in a camera system which is capable of transmitting various kinds of data signals correctly with a transmission speed suitable for each piece of peripheral equipment and accessory attached to the camera.

Another object of the present invention is to provide a data transmission system for use in a camera system which is capable of improving the data processing speed in the camera system for performing a high grade photographing control.

A further object of the present invention is to provide a data transmission system automatically designating clock speed for enabling correct data transmission speed for enabling data communication with various kinds of peripheral equipment, whereby it becomes possible to use various kinds of camera accessories resulting in enabling various kinds of photographing control.

In a data transmission system for a camera of the present invention, selection means generates signals for selecting one of several possible communication designations while clock generating means generate clock signals having different frequencies for the data communication. One of the clock signals is selected by clock selection means in accordance with the selected communication designation, so that data communicating means can communicate with the selected communication designation using a data signal in a serial form under the control of the selected clock signal. The data communicating means may be formed by a central processing unit (CPU) for controlling operation of the camera while the communication designations may include an internal circuit arrangement provided in the camera and an external circuit arrangement provided outside the camera. When the internal circuit arrangement is selected by a signal from the selection means, one of the clock signals having a faster frequency may be selected, so that the CPU can communicate with the internal circuit arrangement under the control of this clock signal at a higher speed. In contrast, when the external circuit arrangement is selected by a signal from the selection means, another one of the clock signals having a slower frequency may be selected, so that the CPU can communicate with the external circuit arrangement at a slower speed.

Therefore, according to the data transmission system of the present invention, it is possible to achieve the above objects.

The above and other objects and features of the present invention will become apparent from the following description of a preferred embodiment of the present invention taken in conjunction with the accompanying drawings.

DETAILED DESCRIPTION OF THE PREFERRED EMBODIMENT

Figure 1B:
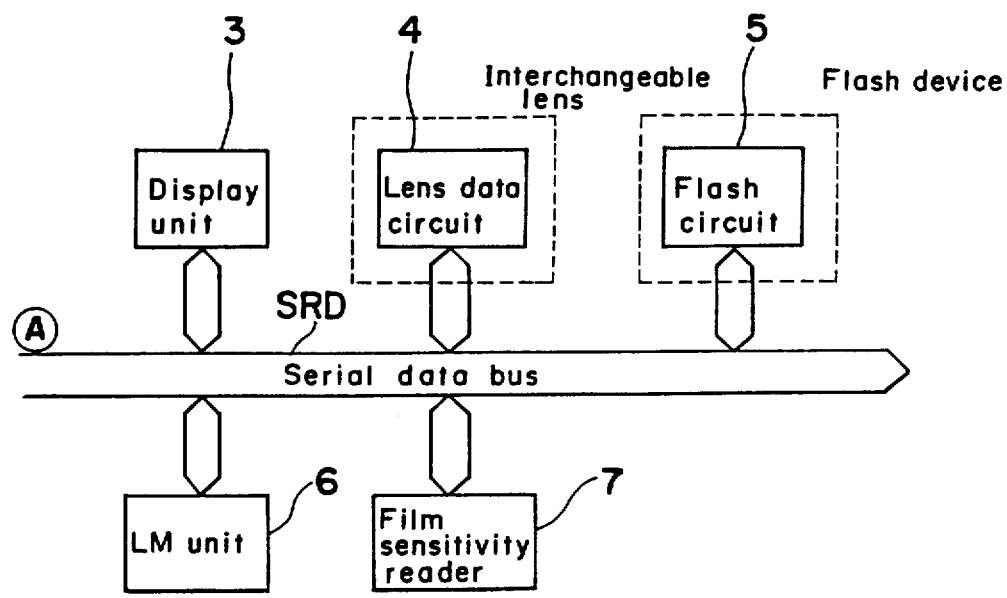
FIG. 1 shows FIGS. 1(A), 1(B), and 1(C) of a circuit diagram showing an embodiment of a camera system in which a data transmission device of a camera of the present invention is adopted.
Figure 1C:
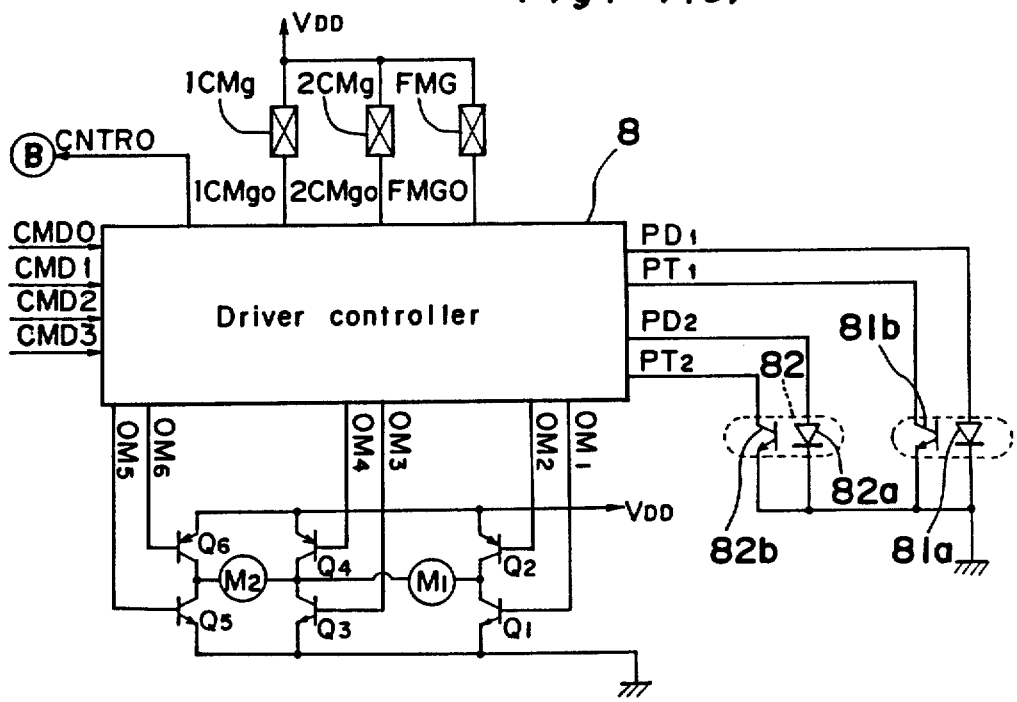

Referring to FIG. 1 showing a circuit diagram of a control device of a camera system to which the present invention is applied, there is provided a central processing unit 1 (referred to as a CPU) using a microcomputer for use in sequence control of the entire camera, calculation and control of an exposure of the camera and an automatic focus control (referred to as AF hereinafter). CPU 1 is provided with various kinds of input and output terminals P1 to P19, a reset terminal RESET, control terminal CNTR, a serial I/O port coupled with serial data bus SRD, and an AF data port coupled with an AF data bus AFD.

Through the AF data bus AFD, the AF data port of CPU 1 is coupled with an automatic focus detection unit 2 (referred to as AF detection unit hereinafter) for measuring a defocus value of an image of a photographic object formed at an equivalent position equivalent to a photographic film surface. The AF detection unit 2 comprises a CCD image sensor (not shown) of one dimension self scan type, CCD driving unit (not shown), an A/D converter (not shown) and a standard power source (not shown) for the A/D conversion. The CCD image sensor produces an image signal of an analogue form upon scanning the photographic object. The image signal in an analogue form produced by the CCD image sensor is converted into a digital form and is transmitted to CPU 1 via AF data bus AFD. $\phi AF$, AF START and AF END are control signal lines for controlling AF detection unit 2, which are respectively connected to the terminals P1 to P3.

Reference numeral 3 shows a display unit using liquid crystal display (LCD) elements or light emitting diode (LED) display elements, a driving unit for the display unit and a data communication unit for receiving from and transmitting to CPU 1 various information such as shutter speed Tv and, aperture value Av which are the result of the automatic exposure (AE) calculation transmitted from CPU 1 and various photographic modes. The information mentioned above is displayed by the display unit 3 and is visually displayed in a view finder (not shown) of the camera.

Reference numeral 4 shows a lens data circuit provided in an exchangeable lens for storing various data prepared in the exchangeable lens such as minimum F number, minimum aperture value, focal length and conversion factor of a shift value of the lens necessary for a focus adjustment. When an exchangeable lens is attached to the camera, the aforementioned data are transmitted to the camera body via electric connection terminals disposed near a portion where engaging members for engaging the exchangeable lens and the camera body are provided.

Reference numeral 5 shows a flash circuit in a flash device, which produces a signal representing mounting of the flash device onto the camera body, a signal representing a guide number for indicating maximum quantity of light emitted by the flash device, a charge completion signal representing the fact that the flash device has been charged up to be ready for flash photography and a flash light control achievement signal representing achievement of a proper flash exposure.

Reference numeral 6 shows a light measurement unit for measuring the brightness Bv of a photographic object. The light measurement unit 6 is comprised of a photoelectric conversion element for receiving light from the photographic object and producing an analog output signal representing the brightness of the object, an A/D converter for converting the analog signal of the photo-electric conversion element into a digital form, a standard power source for the A/D converter and a data transfer unit which communicates with CPU 1. The light measurement unit measures the light having passed through the photographic lens of the camera according to the command from CPU 1.

Reference numeral 7 is a film sensitivity reader for automatically reading the sensitivity of a photographic film loaded in the camera. By the reader 7, information of the film sensitivity described on a film cartridge containing the photographic film can be read by means of electric contacts provided in a cartridge chamber of the camera.

The information produced from the display unit 3, lens data circuit 4, flash circuit 5, light measurement unit 6 and film sensitivity reader 7 is applied to a serial input and output port (I/O) via the serial data bus SRD as the serial signals. In the serial I/O port, a suitable clock pulse of any one of predetermined clock frequencies $\phi_1$ and $\phi_2$ is selected corresponding to the circuits or units 3 to 7 to be used.

Reference numeral 8 is a driver controller for operating a lens driving motor for AF operation and various electro-magnets provided in the camera. The driver controller 8 is controlled by control signals on the lines CMD0, CMD1, CMD2 and CMD3 coupled with the output terminals P15, P16, P17 and P18 of CPU 1. CNTR terminal is a pulse input terminal for counting the number of pulses sent from the driver controller 8.

SW4 to SW1, SWAEL, SWMODE, SWUP and SWDN are switches, and the one ends of the switches are connected to the ground and the others are respectively connected to the input terminals P4 to P11 via the signal lines S4 to S1, AEL, MODE, UP and DN.

SW1 is a light measurement switch which is turned on when a release button (not shown) of the camera is pressed down to the first stage, causing CPU 1 to generate a signal for starting the light measurement and focus detection. While the switch SW1 is on, if the lens is situated at an out-of-focus position, the photographic lens is driven for focusing until it arrives at an in-focus position. When the force depressing the release button is removed and the switch SW1 is turned off, the driving of the photographic lens is stopped immediately.

SW2 is a release switch which is turned on when the release button is depressed to a second stage. In case the switch SW2 is turned on when the shutter of the camera is in a releasable condition, CPU 1 orders initiation of a release operation. Moreover, with the release switch SW2 turned on, the light measurement switch SW1 remains on.

SW3 is a mirror up detection switch, which is turned on when a known reflex mirror (not shown) of the camera moves to its top position for photographing. SW4 is a switch for detecting completion of film winding by the length of one picture frame. This switch SW4 is turned off each time when the photographic film loaded in the camera is wound up by the length of one picture frame, while it remains ON during wind-up of the photographic film.

SWAEL is a switch for holding a light measurement signal generated by the light measurement unit 6, that is, the light measurement signal is held while the switch SWAEL is on and a new light measurement signal is applied to CPU 1 when the switch SWAEL is turned off from the on state. SWMODE is a mode switch for selecting the exposure mode of the camera, and any one of a program mode, a diaphragm priority mode and a shutter speed priority mode can be selected by depressing a switch SWUP or SWDN with the mode switch SWMODE depressed simultaneously. When only the switch SWUP or SWDN is turned on, any aperture value can be set in the diaphragm priority mode and any shutter speed can be set in the shutter speed priority mode.

P12, P13 and P14 are output terminals, which are respectively connected to one input terminal of each of the OR circuits OR1, OR2 and OR3 via control signal lines IENDEN, RELEN and WAKEEN, and the signal lines AFEND, S2 and S1 are respectively connected to the respective other input terminals of the OR circuits OR1, OR2 and OR3. And the output terminals of the OR circuits OR1, OR2 and OR3 are connected to the interruption input terminal INT of CPU 1 via AND circuit AND1. When the terminal INT is changed to L level from H level, the CPU 1 can receive an interruption in an operative state while it starts operation in a stand-by state.

RESET is a reset terminal of CPU 1 which is pulled up to +VDD by a resister R and when the terminal RESET is changed to H level from L level, CPU 1 is reset. X is a crystal oscillator for applying clock signals to CPU 1.

A focusing display unit IFD is connected to the output terminal P19. The focusing display unit IFD is comprised of a buzzer and an LED for display (disposed in the finder of the camera) and the driving portion thereof.

Figure 2:
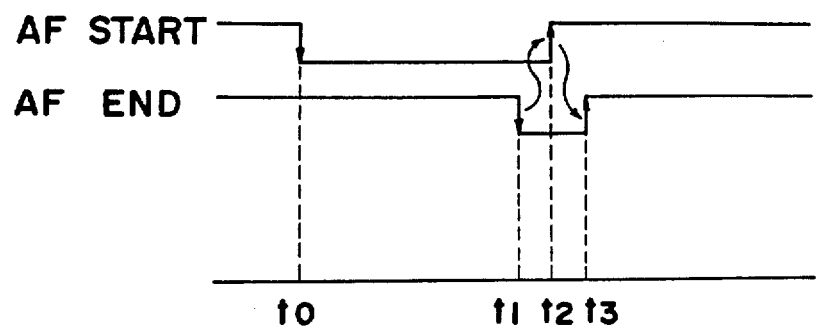
FIG. 2 is a time chart showing an operation of the AF detection unit in FIG. 1.

The control operation of the AF detection unit 2 is explained with reference to a time chart shown in FIG. 2. CPU 1 changes the control signal line AFSTART to L level from H level for causing CCD in the AF detection unit 2 to start charge accumulation (time $t_0$). When the amounts of charges accumulated in the CCD reaches a predetermined level, the AF detection unit 2 informs CPU 1 of the charge accumulation completion in the CCD by changing the control signal line AFEND to L level from H level (time $t_1$). When CPU 1 detects the L level of the control signal line AFEND, the control signal line IENDEN is changed to L level from H level in order to generate interruption signal in CPU 1. Then since the control signal lines RELEN and WAKEEN are in H level respectively, the AND gate AND1 sends a signal which changes the interruption terminal INT to L level from H level and the interruption is enabled in CPU 1. And then the control signal line IENDEN is recovered to H level from L level.

On the other hand, CPU 1 changes the control signal line AFSTART to H level (time $t_2$) by detecting L level of the control signal line AFEND, and when the AF detection unit 2 detects the H level on the line AFSTART, the control signal line AFEND is returned to H level (time $t_3$) and the image information represented by the accumulated charges from CCD which is converted into the digital form is read into CPU 1. When the focus detection of the AF detection unit 2 is finished and the timing for enabling the shutter release comes, the control signal line RELEN is changed to L level from H level. Then since both of the control signal lines IENDEN and WAKEEN are H level, the terminal INT is changed to L level from H level and an interruption occurs again in CPU 1, and then the control signal line RELEN is returned to H level from L level.

Figure 3B:
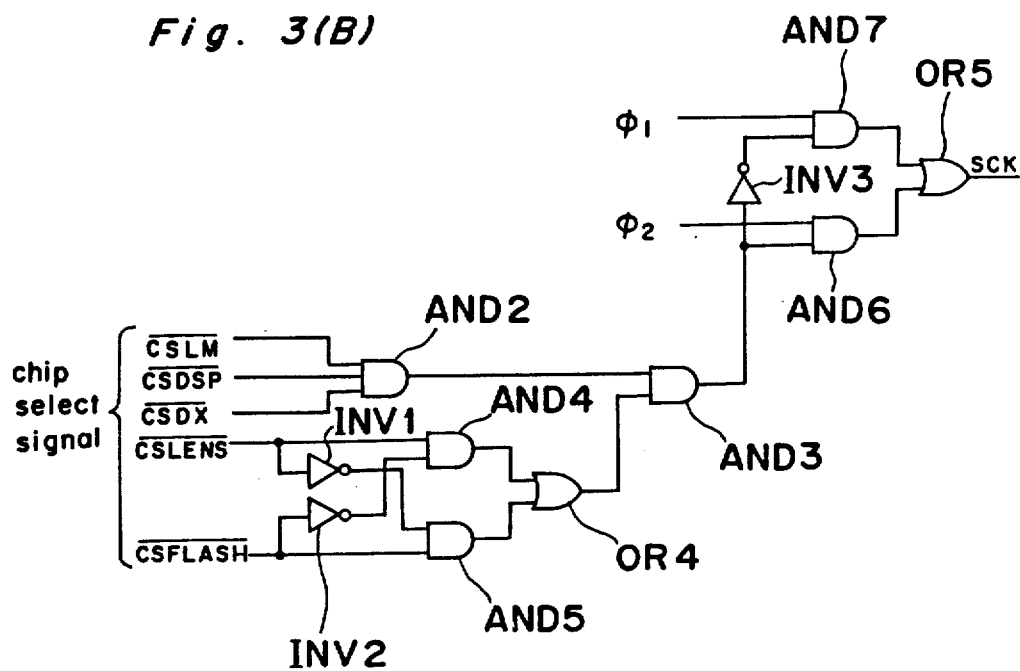
FIG. 3(B) is an embodiment of a clock selection circuit IV in the serial I/O unit of CPU 1 in FIG. 3(A)
Figure 3A:
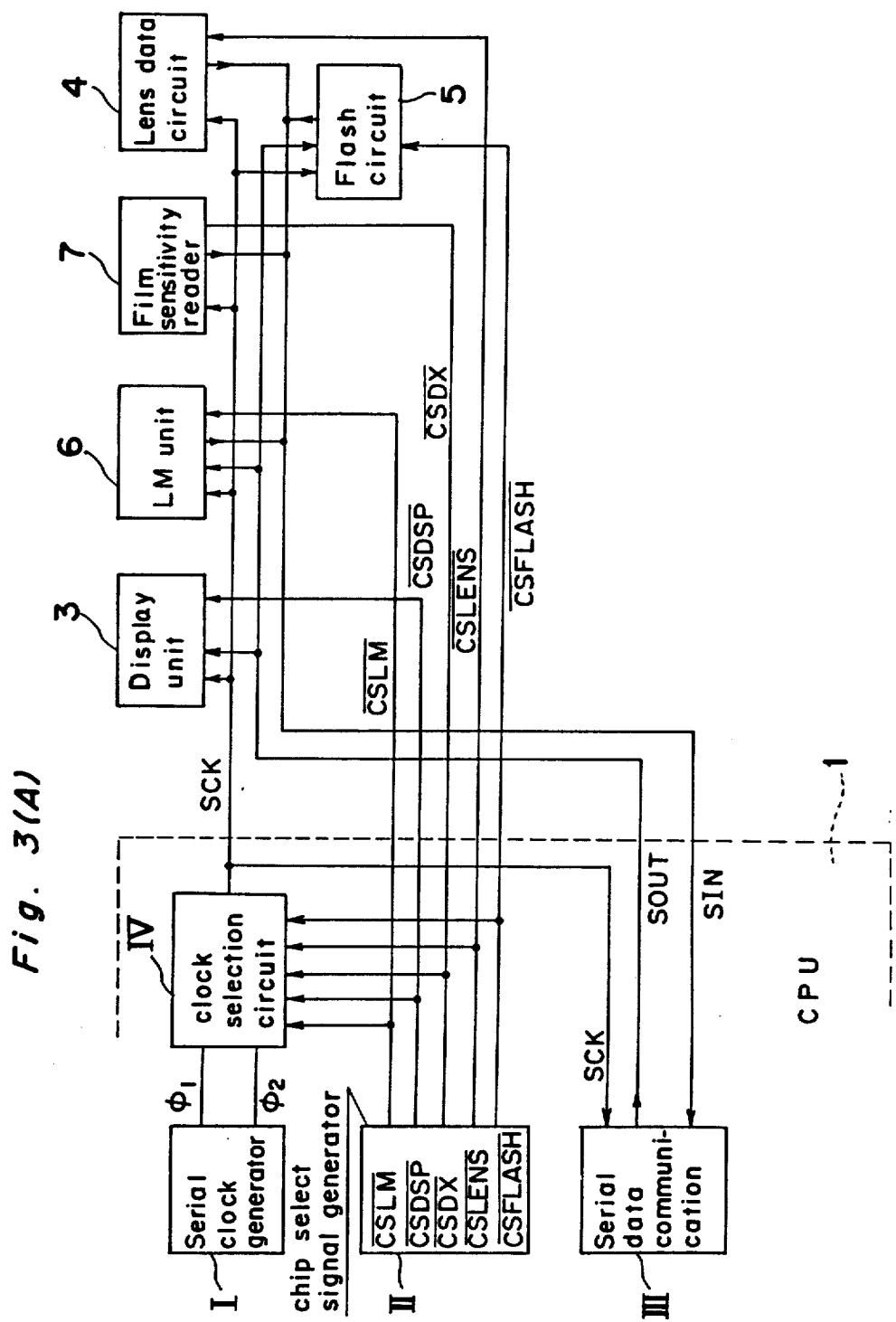
FIG. 3(A) is an embodiment of serial data bus in FIG. 1.

FIG. 3(A) shows an embodiment of serial data bus for communication among the display unit 3, lens data circuit 4, flash circuit 5, light measurement unit 6, film sensitivity reader 7 and CPU 1. FIG. 3(B) shows an embodiment of a clock selection circuit in the serial I/O unit of CPU 1. I is a serial clock generator for producing serial clock pulses, II is a chip select signal generator for generating chip select signals CSLM, CSDSP, CSDX, CSLENS and CSFLASH which are chip select signals for selecting light measurement unit 6, display unit 3, film sensitivity reading unit 7, lens data circuit 4 and flash circuit 5 respectively, and III is a data communication unit for communicating serial data on the basis of the output pulse SCK from the clock selection circuit IV. As shown in FIG. 3(B) each signal of CSLM, CSDSP and CSDX is applied to an AND gate AND2 and the output signal thereof is applied to one of the inputs of an AND gate AND3. Each signal of CSLENS and CSFLASH is applied to one of the inputs of AND gates AND4 and AND5 respectively and is also applied to another input of the AND gates AND5 and AND4 respectively via inverters INV1 and INV2. The output signals of the AND gates AND4 and AND5 are applied to an OR gate OR4 the output signal of which is applied to another input of the AND gate AND3. The output signal of the AND gate AND3 is applied to one of the inputs of an AND gate AND6 and is also applied to one of the inputs of an AND gate AND7 via an inverter INV3. Clock pulse of frequency $\phi_1$ and clock pulse of frequency $\phi_2$ which is lower than the frequency $\phi_1$ are applied to respective inputs of the AND gates AND7 and AND6. The output signals of the AND gates AND6 and AND7 are applied to the OR gate OR5 and are transmitted as a serial clock signal SCK from the OR gate OR5.

Table 1 shows a logic table in the block diagram as mentioned above.

TABLE 1

| CSLM | CSDSP | CSDX | CSLENS | CSFLASH | AND3 | SCK |
|------|-------|------|--------|---------|------|-----|
| L | H | H | H | H | L | $\phi_1$ |
| H | L | H | H | H | L | $\phi_1$ |
| H | H | L | H | H | L | $\phi_1$ |
| H | H | H | L | H | H | $\phi_2$ |
| H | H | H | H | L | H | $\phi_2$ |

In Table 1, in case, for example, the light measurement unit 6 is selected, only CSLM signal becomes L level and the other signals become H level, and in this case an L level signal is output from the AND gate AND3, then the AND gate AND7 is enabled and the serial clock pulses SCK of clock frequency $\phi_1$ are generated from the OR gate OR5. As shown in Table 1, when any one of the light measurement unit 6, display unit 3 or film sensitivity reading unit 7 is selected, the clock frequency of the serial clock pulses SCK becomes $\phi_1$ and when the lens data circuit 4 or flash circuit 5 is selected, the frequency of the serial clock pulses SCK becomes $\phi_2$ which is slower than $\phi_1$.

Since the lens and flash device are connected to the camera body via the electric contacts, the delay of the signal transmission is apt to be produced and the serial data may not be communicated correctly. Therefore the smaller clock frequency $\phi_2$ is adopted as a frequency of the serial clock signal SCK upon communication of the CPU 1 with lens data circuit 4 and the flash circuit 5.

Next, the driver controller 8 and other controllers are explained.

1CMG is an electro-magnet for holding the leading shutter curtain, and when the control output line 1CMGO becomes L level, the magnet 1CMG is energized to hold the leading shutter curtain. 2CMG is an electro-magnet for holding the trailing shutter curtain, and when the control output line 2CMGO becomes L level, the magnet 2CMG is energized to hold the trailing shutter curtain. The interval between timing of release of the leading shutter curtain and the timing of release of the trailing shutter curtain corresponds to the shutter speed. FMG is a diaphragm arresting electro-magnet which arrests the diaphragm in a predetermined position when the control output line FMGO is kept at L level for a predetermined interval.

Reference numerals $Q_1$ to $Q_6$ are transistors. The transistors $Q_1$ to $Q_4$ are for driving a photographing sequence motor $M_1$ and connected in a bridge shape so that the sequence motor M1 can be driven in a reversible manner. The transistors $Q_3$ to $Q_6$ are for driving a lens driving motor $M_2$ and connected in a bridge shape so that the lens driving motor $M_2$ can be driven in a reversible manner. Both terminals of the sequence motor $M_1$ are connected to the common connecting point of the transistors $Q_1$ and $Q_2$ and to the common connecting point of the transistors $Q_3$ and $Q_4$, and also both terminals of the lens driving motor $M_2$ are connected between the common connecting point of the transistors $Q_3$, $Q_4$ and the common connecting point of the transistors $Q_5$, $Q_6$ It is noted that the transistors $Q_3$ and $Q_4$ are used in common in said two bridge circuits. The sequence motor $M_1$ is a photographing sequence control motor, which, upon forward rotation, causes a mirror drive mechanism (not shown) to lift up the reflex mirror to its top position and a diaphragm operating lever (not shown) to stop down the diaphragm, while upon reverse rotation, winds up the photographic film and restores the mirror drive mechanism and the diaphragm operating lever to their initial state, so that the reflex mirror is returned to its lower inclined position and so that the diaphragm is returned to its fully open position. The lens driving motor $M_2$ is a motor for driving a lens used for the AF operation, which upon forward rotation, shifts the lens forward and upon reverse rotation, shifts the lens rearward. $OM_1$ to $OM_6$ are control signal lines for switching each of the transistors $Q_1$ to $Q_6$.

Table 2 shows the on and off condition of the transistors $Q_1$ to $Q_6$ controlled by the control signal lines $OM_1$ to $OM_6$ respectively in order to control the sequence motor $M_1$ and lens driving motor $M_2$.

TABLE 2

| Q1 | Q2 | Q3 | Q4 | Q5 | Q6 | M1 | M2 |
|---|---|---|---|---|---|---|---|
| OFF | OFF | OFF | OFF | OFF | OFF | Stop | Stop |
| ON | OFF | OFF | ON | OFF | OFF | Forward | Stop |
| OFF | ON | ON | OFF | OFF | OFF | Reverse | Stop |
| ON | OFF | ON | OFF | OFF | OFF | Brake | Stop |
| OFF | OFF | OFF | ON | ON | OFF | Stop | Forward |
| OFF | OFF | ON | OFF | OFF | ON | Stop | Reverse |
| OFF | OFF | ON | OFF | ON | OFF | Stop | Brake |

In the above mentioned embodiment, the six transistors $Q_1$ to $Q_6$ are used with two transistors $Q_3$ and $Q_4$ used for both of the bridge circuits, so that the two motors $M_1$ and $M_2$ are prevented from simultaneous driving. By this arrangement, the number of the terminals of CPU 1 and the driver controller 8 can be reduced, and the size of the driver 8 in a substrate can be reduced.

Reference numerals 81 and 82 denote respectively a diaphragm encoder and AF encoder each of a photocoupler. The diaphragm encoder and AF encoder are connected to the driver controller 8 via the control signal lines $PD_1$, $PT_1$ and $PD_2$, $PT_2$ respectively.

The diaphragm encoder 81 is arranged to monitor the stroke of the diaphragm operating lever during the stop-down operation of the diaphragm in the course of a camera releasing operation. The control signal line $PD_1$ becomes H level during the camera releasing in response to energization of the diaphragm arresting electro-magnet FMG and the light emitted by the light emitting diode 81a is detected by the photo transistor 81b and the signal produced by the photo transistor 81b is applied to the driver controller 8 via the control signal line $PT_1$. The output signal of the photo transistor is wave shaped into pulse by the driver controller 8 and is sent to the count input terminal CNTR of CPU 1 via the control signal line CNTRO. The control signal line $PD_1$ is kept in L level except for a period of the camera releasing.

AF encoder 82 is arranged for monitoring the revolutions of the lens driving motor $M_2$, that is, the amount of movement of the lens at the time of AF operation. At the time of AF operation, the control signal line $PD_2$ becomes Hi and the light emitted by the light emitting diode 82a is detected by the photo transistor 82b and the output signal of the photo transistor 82b is applied to the driver controller 8 via the control signal line $PT_2$. Then the signal is sent to the terminal CNTR of CPU 1 via the control signal line CNTRO after the signal is waveshaped into pulse by the driver controller 8. The aforementioned control signal line $PD_2$ is low except at the time of the AF operation.

In the present embodiment as mentioned above, both the signals from the diaphragm encoder 81 and AF encoder 82 are applied to the terminal CNTR of CPU 1 after being waveshaped by the driver controller 8. Thus, the number of the terminals of the driver controller 8 and CPU 1 can be reduced.

CMD0 to CMD3 are control signal lines from the output terminals P15 to P18 of CPU 1 for control of the driver controller 8.

Figure 4:
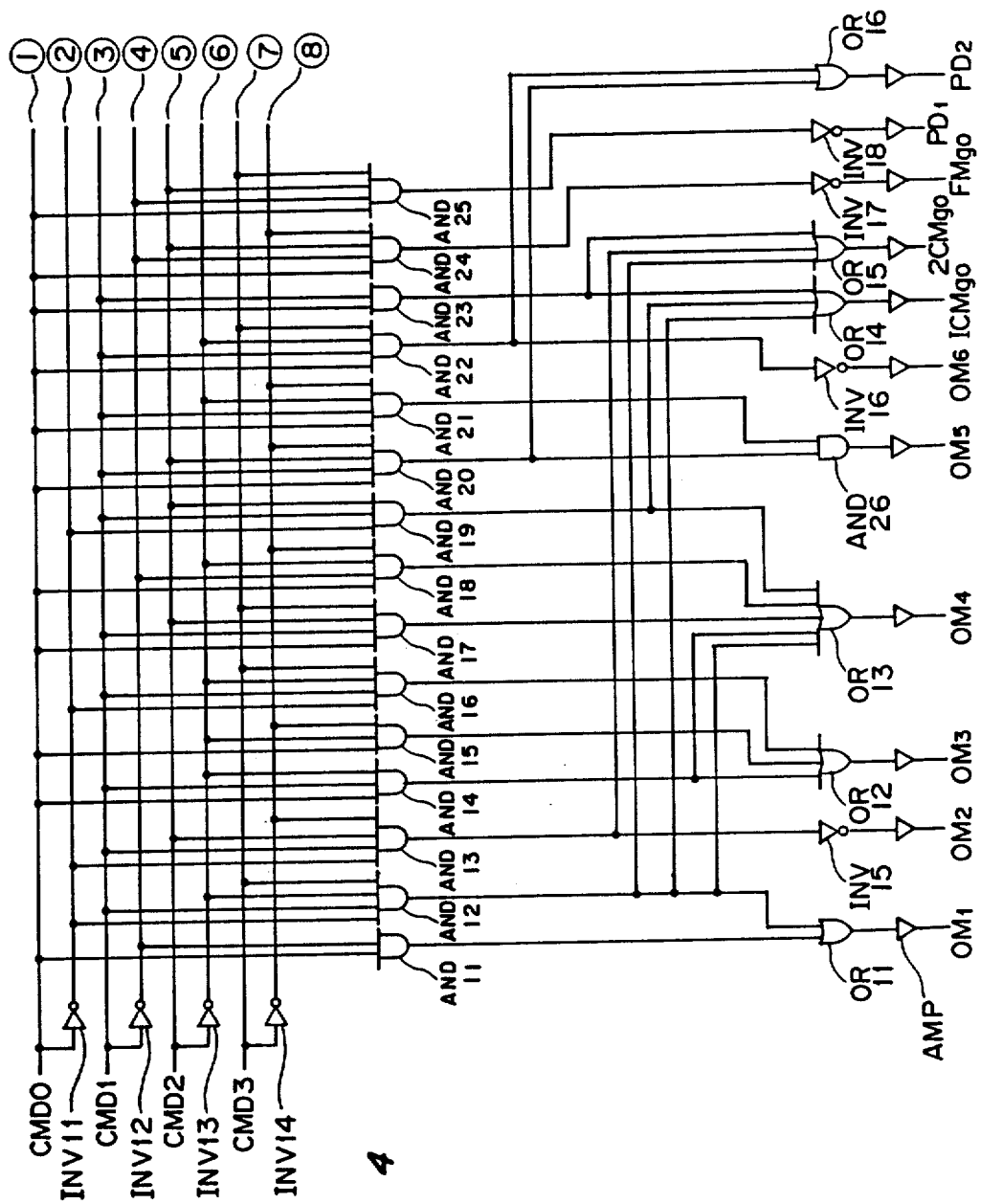
FIG. 4 is a circuit diagram of a decoder in a driver circuit portion in FIG. 1, FIGS. 5, 6(A), 6(B), 6(C), 7, 8, 9(A), 9(B), and 10-12 are flow charts for explaining the operation of the camera system in FIG. 1.

The arrangement of the decoder unit in the driver controller 8 is explained with reference to FIG. 4.

Each of the control signal lines CMD0 to CMD3 forms the lines 1, 3, 5 and 7 of the matrix structure, and the control signal lines CMD0 to CMD3 are inverted by inverters INV11 to INV14 so as to form the lines 2, 4, 6 and 8. Then the lines 1 and 4 are connected to an AND gate AND11 and the lines 2, 3, 6 and 7 are connected to an AND gate AND12. AND gates AND13 to AND25 are respectively connected to the lines as shown in FIG. 4. The output terminals of the AND gates AND11 and AND12 are connected to an OR gate OR11 and the output of the OR gate OR11 is connected to a driver amplifier AMP. The output of the driver amplifier AMP becomes the signal line $OM_1$ and other control signal lines $OM_2$ to $OM_6$, 1CMGO, 2CMGO, FMGO, $PD_1$ and $PD_2$ are respectively formed by the arrangement of inverters INV15 to INV18, OR gates OR12 to OR16, AND gate AND26 as shown in FIG. 4.

Table 3 shows the logic values of the outputs of the decoder and the respective operation of the camera.

TABLE 3

| Control order of CPU | | | | Output of driver circuit | | | | | | | | | | | Control operation of camera |
|---|---|---|---|---|---|---|---|---|---|---|---|---|---|---|---|
| CMD0 | CMD1 | CMD2 | CMD3 | OM1 | OM2 | OM3 | OM4 | OM5 | OM6 | 1CMGO | 2CMGO | FMGO | PD1 | PD2 | |
| H | H | H | H | L | H | L | H | L | H | H | H | H | L | L | Camera stop |
| H | H | H | L | L | H | L | L | H | H | H | H | H | L | H | Motor M2 for- |

TABLE 3-continued

| Control order of CPU | | | | Output of driver circuit | | | | | | | | | | | Control operation of camera |
|---|---|---|---|---|---|---|---|---|---|---|---|---|---|---|---|
| CMD0 | CMD1 | CMD2 | CMD3 | OM1 | OM2 | OM3 | OM4 | OM5 | OM6 | 1CMGO | 2CMGO | FMGO | PD1 | PD2 | |
| | | | | | | | | | | | | | | | ward rotates (forward lens shift), count AF pulse |
| H | H | L | H | L | H | H | H | L | L | H | H | H | L | H | Motor M$_2$ reverse rotates (rearward lens shift), count AF pulse |
| H | H | L | L | L | H | H | H | H | H | H | H | H | L | L | Motor M$_2$ brake |
| H | L | H | H | H | H | L | L | L | H | L | L | H | H | L | Motor M$_1$ (mirror up), leading and trailing shutter curtains hold, count diaphragm pulse |
| H | L | H | L | H | H | L | L | L | H | L | L | L | L | L | Motor M$_1$ (mirror up), leading and trailing shutter curtains hold, diaphragm MG on |
| H | L | L | H | H | H | L | L | L | H | L | L | H | L | L | Motor M$_1$ (mirror up), leading and trailing shutter curtains hold |
| H | L | L | L | H | H | H | H | L | H | L | L | H | L | L | Motor M$_1$ brake, leading and trailing shutter curtains hold |
| L | H | H | H | L | H | L | H | L | H | H | L | H | L | L | trailing shutter curtain hold |
| L | H | H | L | L | L | H | H | L | H | H | H | H | L | L | Motor M$_1$ (wind) |
| L | H | L | H | H | H | H | H | L | H | H | H | H | L | L | Motor M$_1$ (brake) |

By this arrangement, six control signal lines OM$_1$ to OM$_6$ for driving the motors M$_1$ and M$_2$, three control signal lines 1CMGO, 2CMGO and FMGO for controlling three magnets 1CMG, 2CMG and FMG, and two control signal lines PD$_1$ and PD$_2$ for controlling the two light emitting diodes 81a and 82a, thus, total eleven control signal lines can be controlled by the signals from four control signal lines CMD0 to CMD3, and therefore the number of the output terminals of CPU 1 and the circuit lines can be reduced.

The operation of the camera system according to the arrangement mentioned above is explained with reference to flow charts shown in FIGS. 5 to 12 hereinafter.

Figure 5:
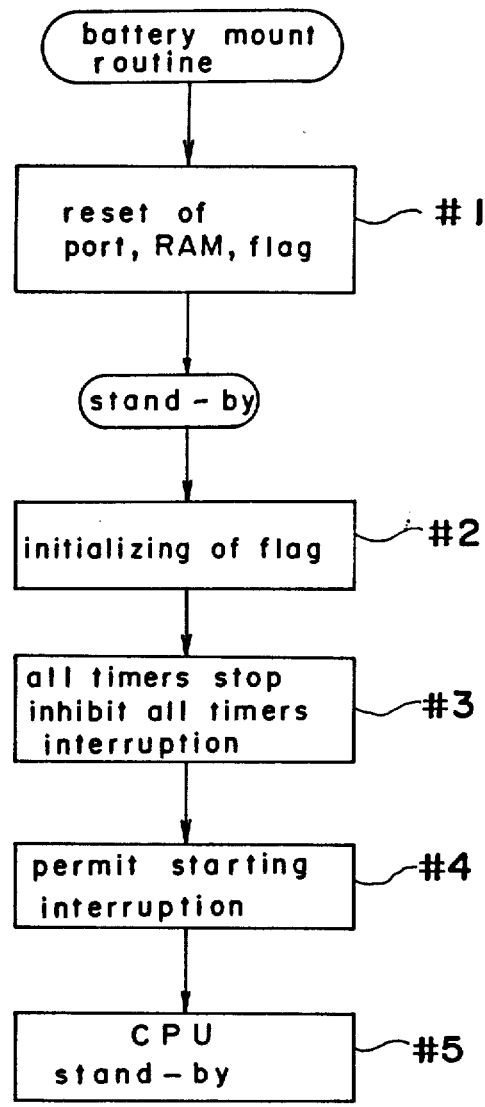

First, when a battery is mounted in a camera body and the power is supplied to the reset terminal RESET of CPU 1 via the resister R, the terminal RESET is set to H level from L level, whereby CPU 1 is reset and the battery loading routine is executed as shown in FIG. 5.

In the step #1 the port of I/O portion in CPU 1, the memory portion RAM (random access memory) and flags for judging various kinds of conditions are cleared and the program goes to the stand-by routine. In the step #2 the flags are initialized, and in the step #3 timers accommodated in CPU 1 are stopped and interruptions by the timers are inhibited. In the step #4 a starting interruption is permitted. Thus, the control signal line $\overline{\text{WAKEEN}}$ is changed to L level from H level so that the starting interruption by turn-on of the light measurement switch SW1 can be permitted when the release button is depressed to the first stage. In the step #5 CPU 1 stops the clock and goes to the stand-by condition.

In the stand-by condition of CPU 1, the control signal lines $\overline{\text{IENDEN}}$ and $\overline{\text{RELEN}}$ are set to H level and only the control signal line $\overline{\text{WAKEEN}}$ is in L level as mentioned above. Therefore, each output of the OR gates OR1 and OR2 is settled in H level in spite of the condition of the control signal lines AFEND and S2 applied to the other inputs of the OR gates OR1 and OR2. In case the release button is not pressed and the light measurement switch SW1 is off, the control signal line S1 which is applied to the other input of the OR gate OR3 is set to H level and the OR gate OR3 generates H level, therefore H level is applied to the interruption terminal INT via the AND gate AND$_1$.

Figure 6A:
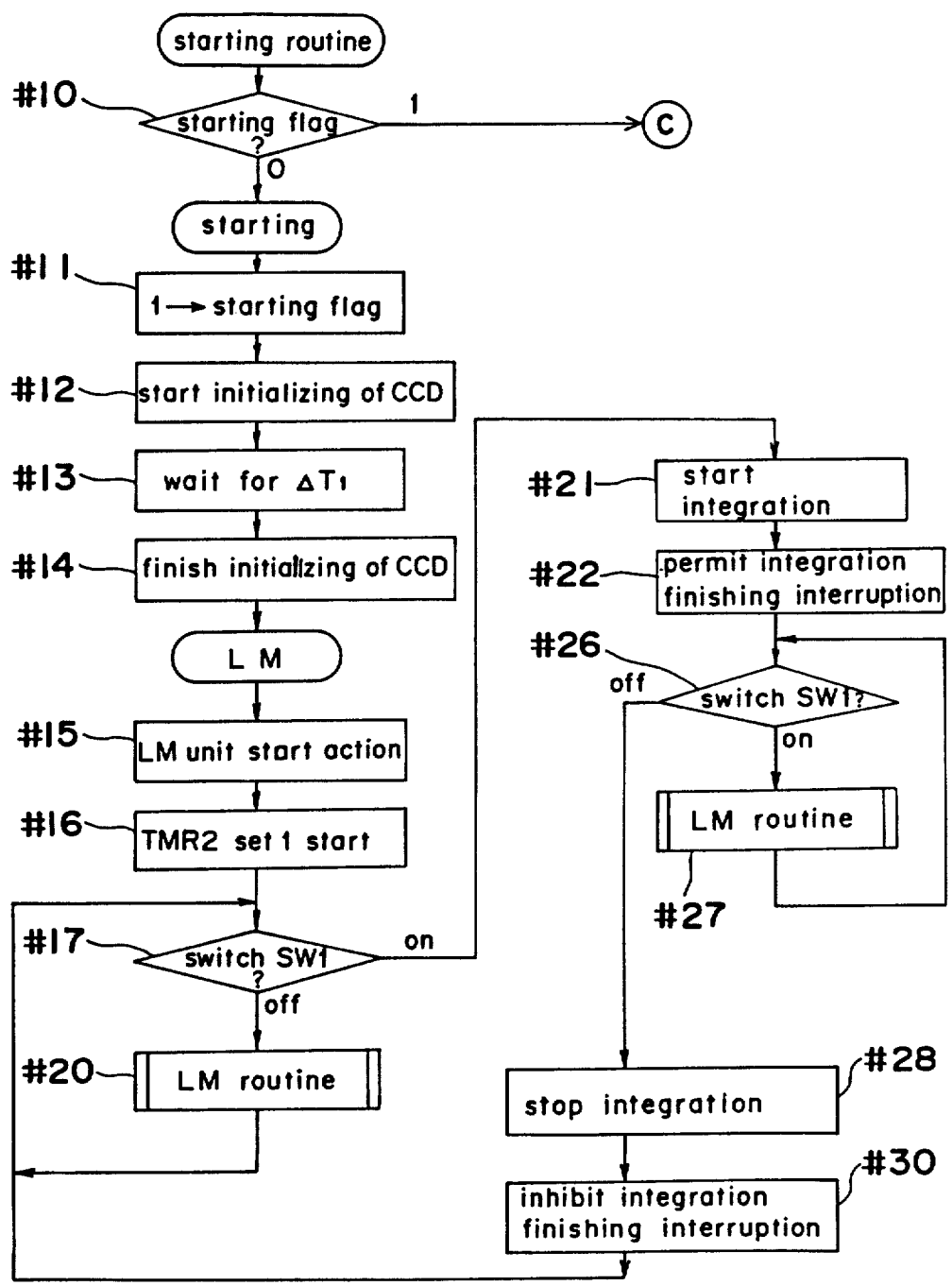
Figure 6B:
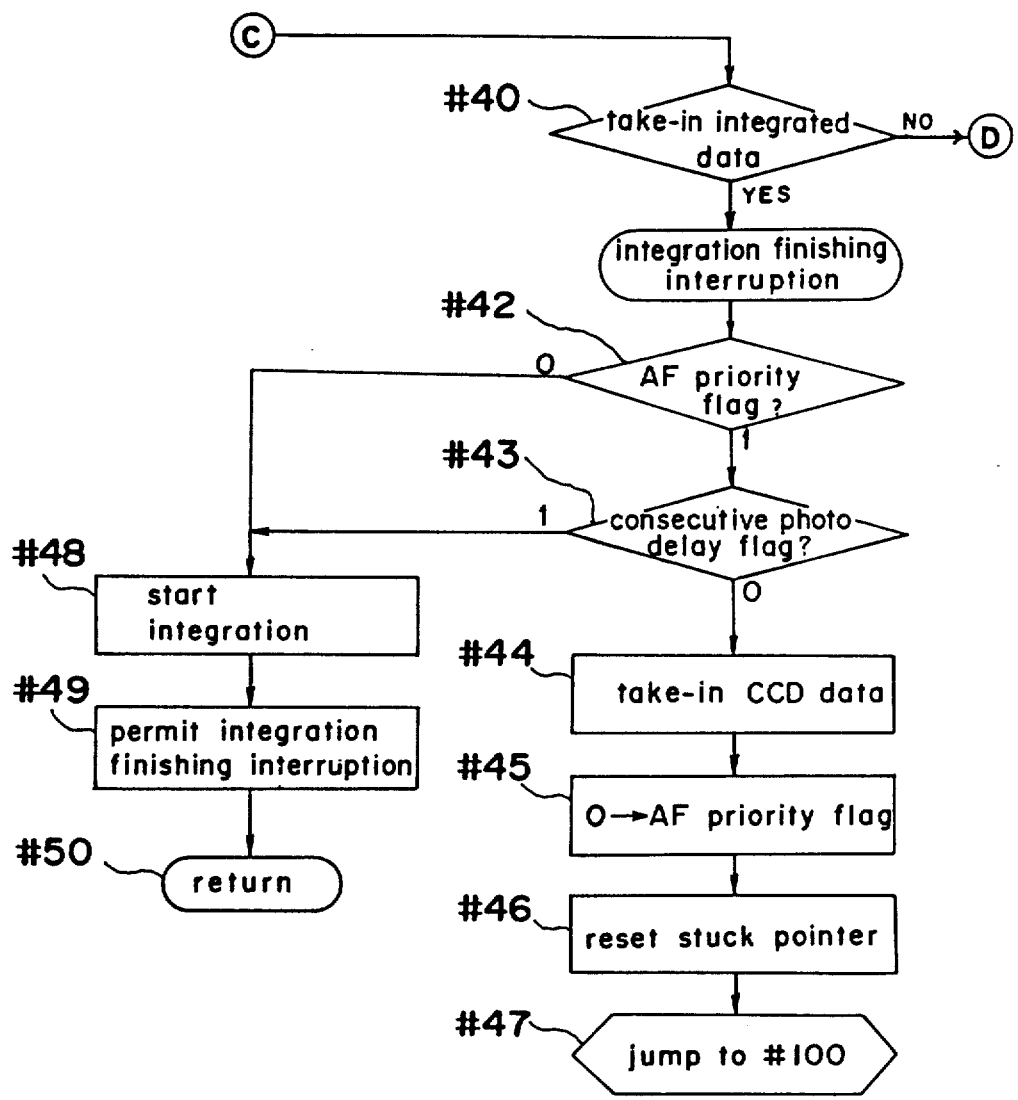
Figure 6C:
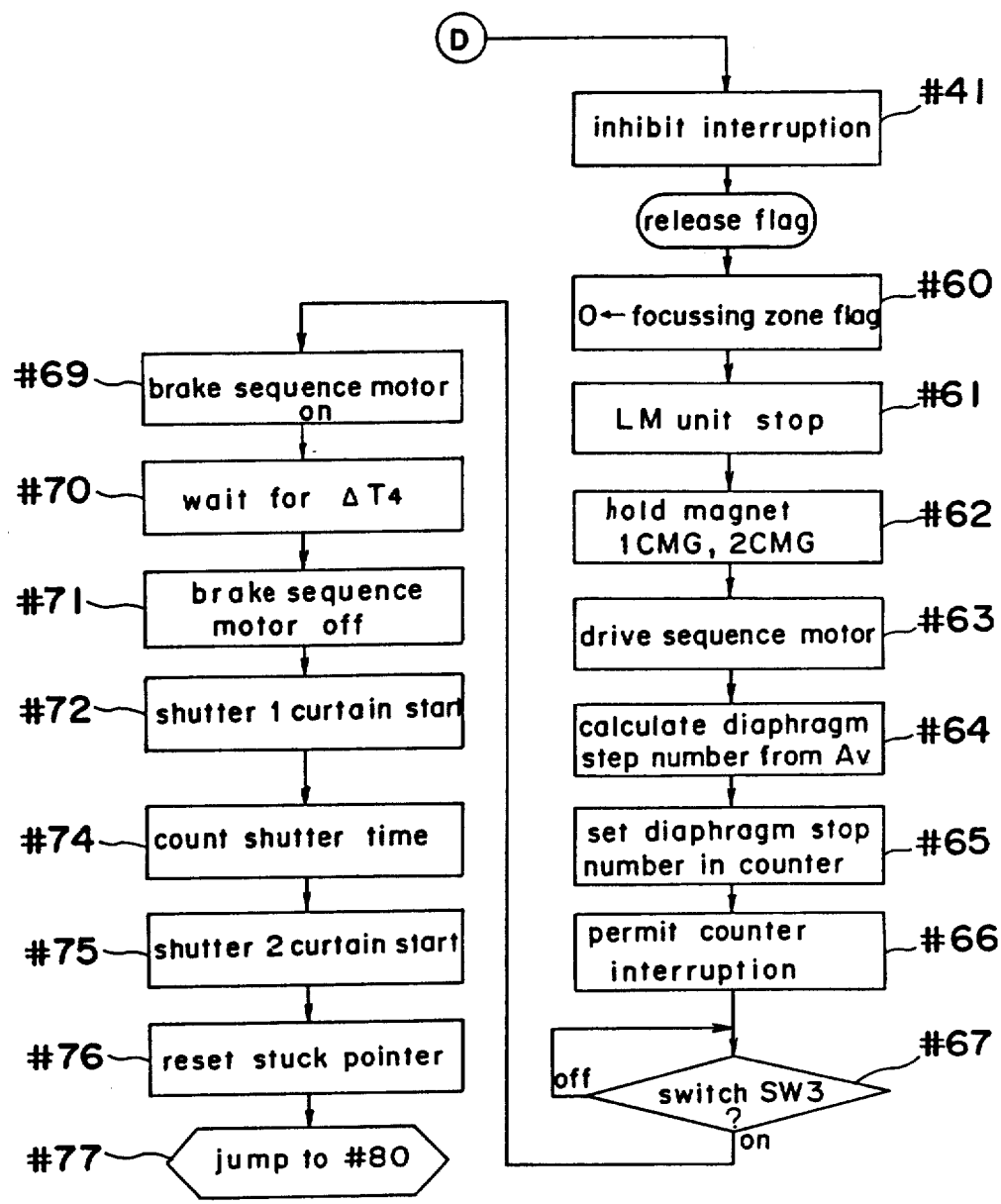

Next, when the light measurement switch SW1 is turned on from off state when the release button is depressed to the first stage, the control signal line S1 becomes L level and the OR gate OR3 generates L level, and therefore the output of the AND gate AND$_1$ is changed to L level from H level. Thus the starting interruption takes place and CPU 1 is changed to starting condition from standby condition, and the starting routine as shown in FIGS. 6(A) to 6(C) is executed.

In the step #10 the condition of the starting flag is judged. The starting flag is set to "1" after the starting of CPU 1 and is reset to "0" immediately before CPU 1 becomes to be in the stand-by condition. Therefore, immediately after the starting of CPU 1, the starting flag is "0" and the program goes to the starting process program of the step #11. In the step #11 the aforementioned starting flat is set "1" and the control signal line $\overline{\text{WAKEEN}}$ is changed to H level from L level. Thus, the OR gate OR3 generates H level, whereby the interruption terminal INT is kept in H level via the AND gate AND$_1$, preventing the starting interruption from occurring in CPU 1 again. In the step #12 the CCD in AF detection unit 2 is initialized and unnecessary charges stored in the CCD when the camera is not used are removed. In the step #13, CPU 1 waits for a period of time $\Delta T_1$ to initialize the CCD, and then the initialization of the CCD is finished in the step #14. Subsequently the program goes to the light measurement process beginning from the step #15.

In the step #15 a command signal for starting the light measurement is transmitted from the serial I/O portion to the light measurement unit 6 via the serial data bus SRD, whereby the measurement of the brightness of a photographic object through the lens is started. In the next step #16 the timer TMR2 for holding the power source is set and started. In case the switches SW1, SW2, SWAEL, SWUP and SWDN are not closed till the time interval $\Delta T_5$ set in the timer TRM$_2$ passes, CPU 1 becomes in the stand-by condition. In the step #17 the state of the light measurement switch SW1 is judged, and in case the switch SW1 is off, i.e., the control signal line S1 is in H level, the program goes to the loop from the step 17 to the light measurement routine of the step #20.

Figure 7:
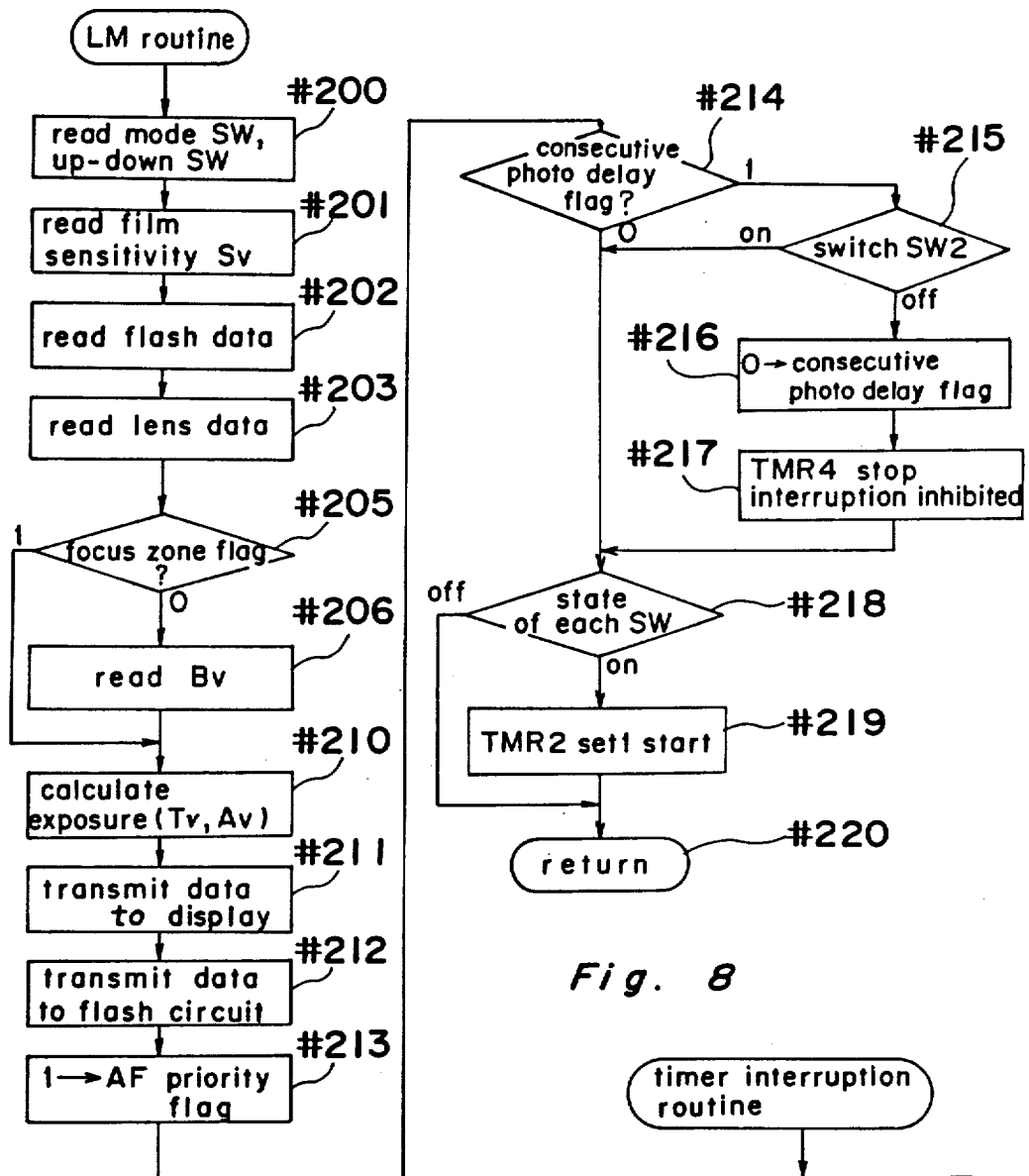

The light measurement (LM) routine is explained with reference to FIG. 7. In the step #200 the state of each of the switches SWMODE, SWUP, SWDN is read, whereby the exposure mode as well as the aperture value Av and the shutter speed Tv in each exposure mode is set. In the step #201 the film sensitivity Sv read by the film sensitivity reading unit 7 is transmitted to CPU 1 via the serial data bus SRD. In the step #202 the signal representing the mounting of the flash device onto the camera, the charge completion signal and the flash control achievement signal, etc. are transmitted to CPU 1 from the flash circuit 5 via the serial data bus SRD. In the step #203 the lens data such as the minimum F number, the minimum aperture value, the focal length and the conversion factor of the mounted exchangeable lens are transmitted to CPU 1 from the lens data circuit 4 via the serial data bus SRD. As described above, the frequency of the clock signal on the serial data bus SRD is selected to be $\phi_1$ or $\phi_2$ depending on whether the destination of the data communication with the CPU 1 is the circuits 3, 6 and 7 in the camera body or the circuits 4 and 5 connected to the outside via the electric contacts.

In the step #205 the condition of the focusing zone flag is judged. The flag is set to "1" by the focus detection when the lens is in an in-focus condition or when it is brought into an in-focus condition after the lens is driven by the AF operation. And only when the lens is not in an in-focus condition i.e. the flag is set to "0", the brightness value Bv of a photographic object is measured again by the light measurement unit 6 in the step #206. This is because there is a function in the present embodiment that the brightness value Bv is kept unchanged once when the lens is set to an in-focus position.

In the step #210 the aperture value Av and the shutter speed Tv are calculated according to a predetermined algorithm using the data read in the above steps #200 to #206. In the step #211 the calculated data as well as the set exposure mode data is transmitted to the display unit 3 via the serial data bus SRD in order to have the display unit display the calculated aperture value Av, shutter speed Tv and exposure mode in the finder. In the step #212 the data such as aperture value Av and film sensitivity Sv are transmitted to the flash circuit 5. Since a series of the operation with reference to the exposure calculation is finished when the above mentioned steps #200 to #212 are completed, the AF priority flag is set to "1" in the next step #213. The AF priority flag is set for determining which of the light measurement loop and the data take in operation from the CCD is to be performed primarily during charge accumulation in the CCD when the light measurement routine is performed.

In the step #214 the condition of a consecutive or continuous photographing delay flag is judged. In case the consecutive photographing delay flag is reset to "0", the program goes to the step #218 but in case of "1" of the consecutive photographing delay flag, the program goes to the step #215, as described below. The steps #215 to #217 constitutes a loop for judging whether the consecutive photographing delay is to be interrupted or not.

In the step #215 the state of the release switch SW2 is judged, and in case the release switch SW2 is on, the program goes to the step #218 and the consecutive photographing delay mode is kept, but in case the switch SW2 is off, the consecutive photographing delay mode is interrupted. That is, the consecutive photographing delay flag is reset to "0" in the step #216, and in the next step #217 a timer TMR4 is stopped and an interruption by the timer TMR4 is inhibited. Thus, the consecutive photographing delay mode is interrupted when the release switch SW2 is turned off during operation of the consecutive photographing, and therefore, consecutive photographing of higher speed becomes possible by turning the release switch SW2 on again.

In the next step #218 the states of the various kinds of operation switches SW1, SW2, SWAEL, SWMODE, SWUP and SWDN are detected for judgement of whether or not the power source is to be further supplied to the control device and the time interval $\Delta T_5$ is set again by the timer TMR2 for holding power source in the step #219 only when any one of the switches is closed. After that, the program returns to the step #17 of the starting routine in the step #220.

Figure 8:
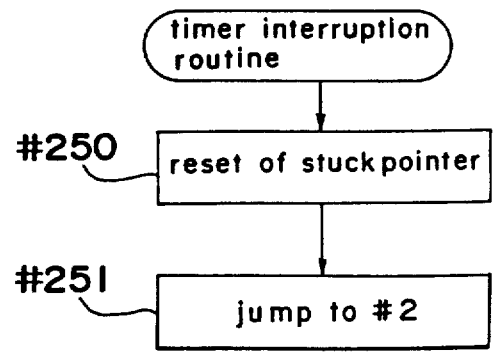

When none of the switches SW1, SW2, SWAEL, SWMODE, SWUP and SWDN is closed and the time interval $\Delta T_5$ passes after the timer TMR2 for holding the power source is started, a timer interruption by the timer TMR2 takes place as shown in FIG. 8.

In this case, a stack pointer is reset in the step #250 and the program jumps to the step #2 in the step #251, whereby subsequently CPU 1 enters in the stand-by condition.

On the other hand, in case the "on" state of the light measurement switch SW1 is detected in the step #17, the program goes to the integration (charge accumulation) routine beginning from the step #21.

In the step #21 the control signal for the AF detection unit 2 on the line AFSTART is changed to L level from H level, whereby the command signal for starting the charge accumulation at the CCD is sent out and the charge accumulation in the CCD is started. In the next step #22, a charge accumulation finishing interruption is enabled. That is, the control signal line IENDEN of CPU 1 is changed from H level to L level so that the CPU 1 can receive an external interruption when the amounts of the charges stored in the CCD reach a predetermined level and the control signal line AFEND is changed from H level to L level indicating the finishing of the charge accumulation in the CCD. In the next step #26 the state of the light measurement switch SW1 is judged, and in case the switch SW1 is on, the program returns to the loop of the steps #26 to #27 again of the light measurement routine in the step #27 as shown in FIG. 7 and waits for the charge accumulation finishing interruption.

In case the camera is once brought into the operating condition from the stand-by condition by turn on of the light measurement switch SW1, and then the light measurement and the charge accumulation in the CCD are simultaneously started, the program goes round the light measurement routine in the step #27 at least one time but the image information data from the CCD is not received when the AF priority flag is not set to "1" in the step #213.

On the other hand, when it is judged in the step #26 that the light measurement switch SW1 is off, the control signal line AFSTART from the output terminal P2 of CPU 1 is recovered to H level from L level in the step #26, whereby the command signal to compulsively stop the charge accumulation in the CCD is transmitted to the AF detection unit 2. And in the step #30 the control signal line $\overline{\text{IENDEN}}$ is recovered to H level from L level, whereby the charge accumulation finishing interruption is disabled and subsequently the program returns back to the step #17.

In case the charge accumulation in the CCD is finished and the control signal line AFEND is changed from H level to L level while the program is going round the loop of the steps #26 to #27, the charge accumulation finishing interruption takes place as described above and the program goes to the steps after the step #10.

Thus, the program goes to other routine by interrupting CPU 1 when the charge accumulation in the CCD is finished because the time interval for the charge accumulation in the CCD varies with the brightness of the photographic object and the time interval control of the routine for the charge accumulation becomes difficult, so that CPU 1 cannot be utilized effectively.

In the step #10 the condition of the starting flag is judged, but the program goes to the step #40 from #10 because CPU 1 has been already started and the starting flag has been set to "1", whereby the CPU 1 judges whether or not take-in of the image information from the CCD via the AF data bus is being effected and in case the take-in operation is finished, the program goes to the release process routine after the step #60 after an interruption is disabled in the step #41. In case the image information is being taken at this time, the program goes to the routine of the charge accumulation finishing interruption process beginning from the step #42.

In the step #42 it is judged whether or not the AF priority flag has been set, and in case the program has not gone round the light measurement routine at all and the AF priority flag has not been set to "1", the priority is given not to the take-in operation of the image information from the CCD but to the light measurement. To this end, after the command signal for starting charge accumulation is transmitted again to the AF detection unit 2 in the steps #48 and #49 as in the steps #21 and #22 mentioned above, the charge accumulation finishing interruption is enabled. In the next step #50 the program goes back to the steps #26 and #27 of the former routine.

Figure 9A:
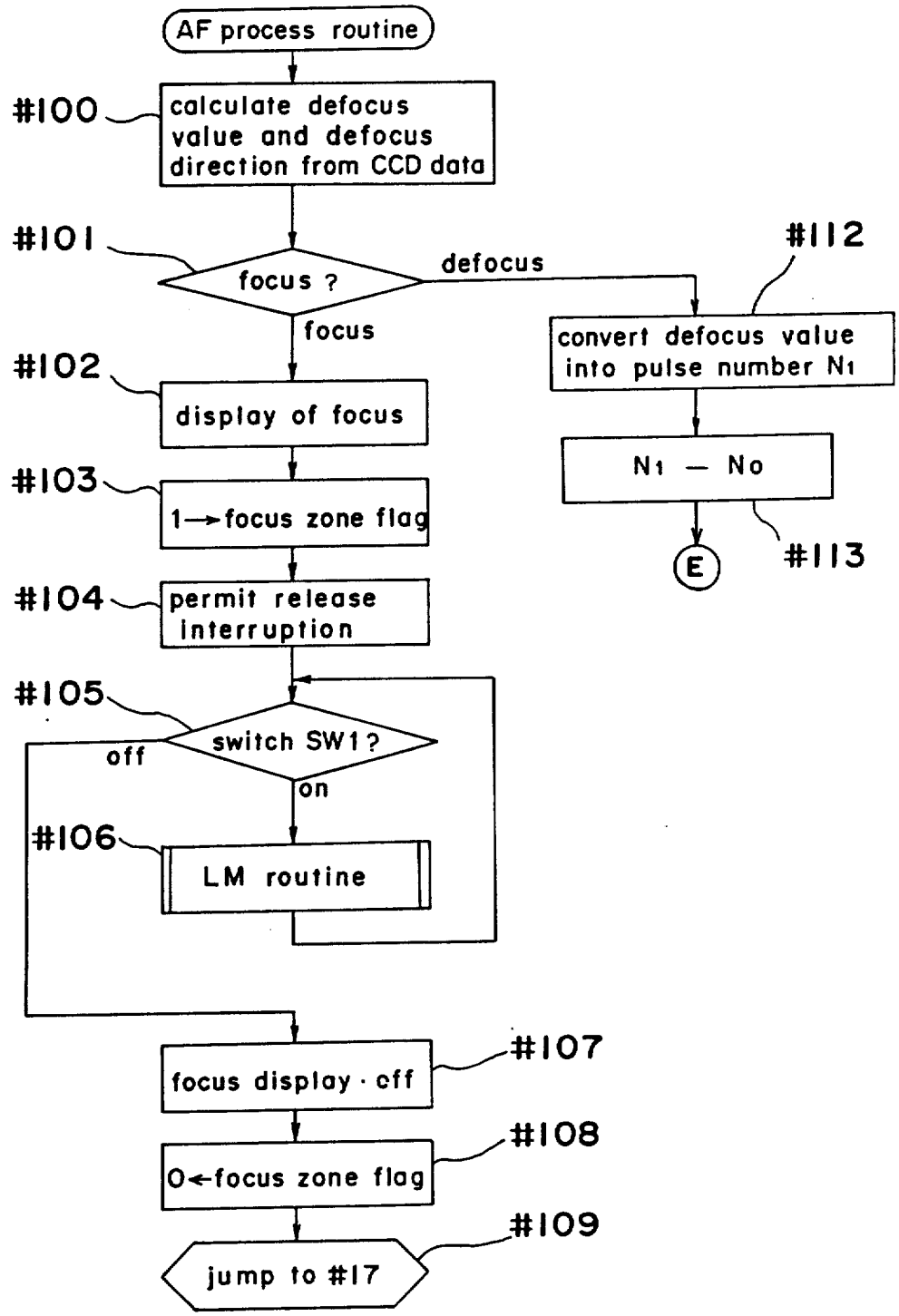
Figure 9B:
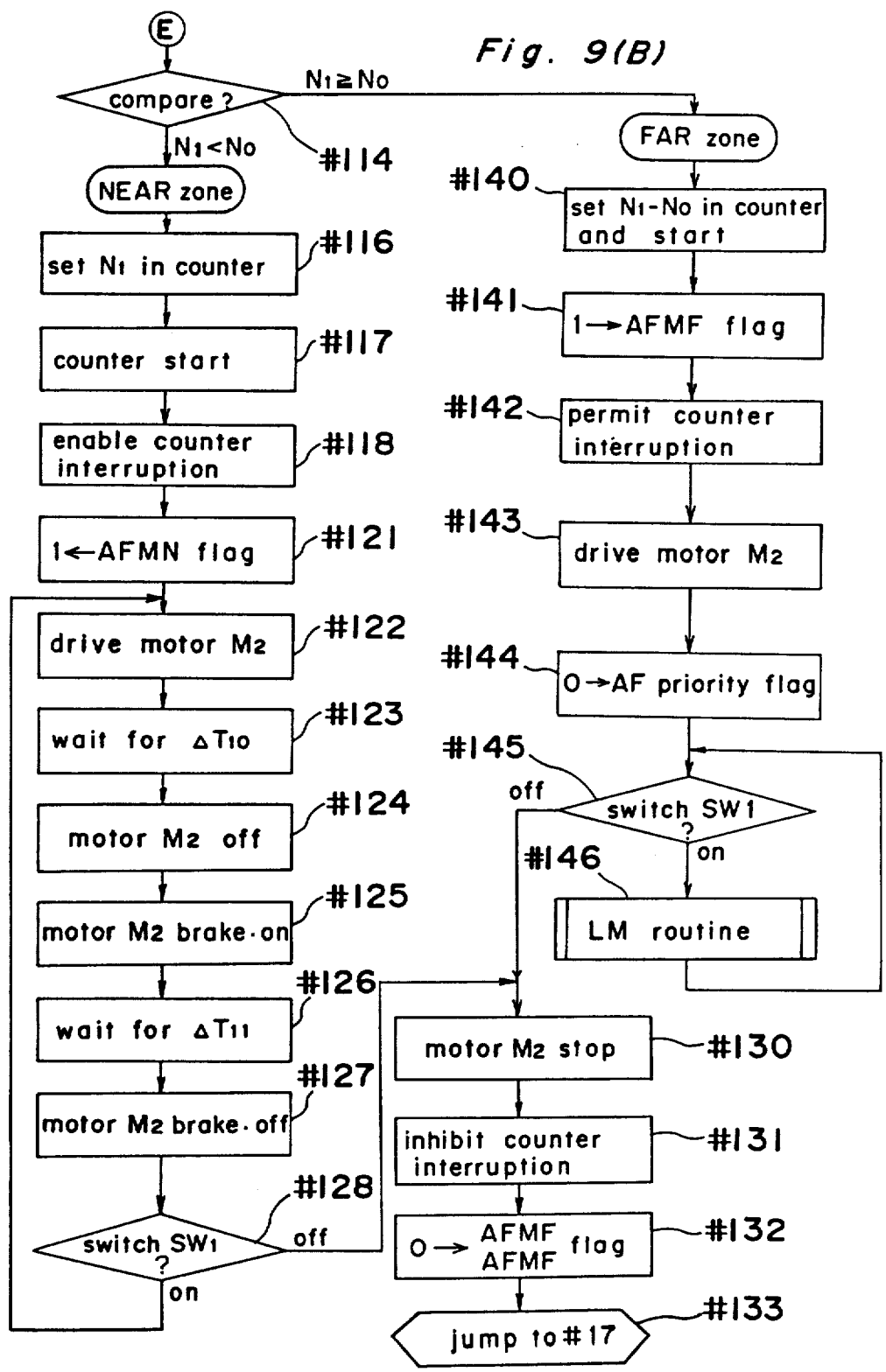

On the other hand, in case the AF priority flag has been set to "1" in the step #42, the program goes to the step #43 wherein it is judged whether or not the consecutive photographing delay flag has been set "1" by termination of wind-up of the photographic film. In case the consecutive photographing delay flag has been set to "1" during the delay in the consecutive photographing, the program goes to the step #48 without taking the image information from the CCD, so that charge accumulation in the CCD is effected again. On the other hand, in case the consecutive photographing delay flag has been reset to "0", the program goes to the step #44 and the image information from the CCD converted into the digital form in the AF detection unit 2 is transmitted in turn to CPU 1 via the AF data bus AFD. The AF priority flag is reset "0" in the step #45, and the stack pointer is reset for preventing the program from returning to the former routine in the step #46. Hence, in the step #47 the program jumps to the AF process routine beginning from the step #100 as shown in FIGS. 9(A) and 9(B).

Thus, charge accumulation in the CCD is started in the step #21 at the same time of the starting of the light measurement calculation in the step #15, but even if the charge accumulation in the CCD is finished during the first light measurement calculation with the AF priority flag set to "0", the charge accumulation in the CCD is only repeated through the steps #42 to #48 without taking the image information from the CCD. Therefore, the charge accumulation in the CCD may be finished in a comparatively short time by getting out of the loop of the steps #26 and #27 from the time of the end of the light measurement calculation, and the program can go to the AF process routine. Hence, the process time interval can be shortened as compared with a case where the charge accumulation in the CCD is started after the end of the first light measurement calculation. That is, in case the photographic object is comparatively dark and it takes a long time for the charge accumulation in the CCD, the charge accumulation is finished after the end of the light measurement calculation and, therefore the time interval required for judging the focus condition becomes shorter than in the case where the charge accumulation is started after the end of the light measurement calculation.

In case the photographic object is comparatively bright and short time is necessary for the charge accumulation in the CCD, the charge accumulation is finished in a period during the light measurement calculation. However, as the charge accumulation in the CCD is started again, the time interval from the end of the light measurement calculation to the end of the charge accumulation in the CCD, at maximum, becomes equal to the time interval required when the charge accumulation is started after the end of the light measurement calculation and this time interval is generally half of the time interval necessary for the charge accumulation in the CCD in average.

The reason why the image information from the CCD is not taken in but charge accumulation in the CCD is started again in the step #43 to #48 even if the interruption by finishing of the charge accumulation in the CCD takes place with the consecutive photographing delay flag is set to "1" is as follows:

If the image information from the CCD is taken in response to the charge accumulation finishing interruption occurred in the period of the consecutive photographing, the amount of defocusing, that is the amount of the shifting of the photographic lens for the AF operation, is calculated, and in case it is judged that an in-focus condition has been already achieved (the amount of defocusing is zero), the lens is held at the in-focus position. As a result, in case a photographic object moves or the field of view is changed in the consecutive photographing before the camera release is enabled, the focus point may be shifted upon the camera release effected after cancellation of the consecutive photographing mode.

Accordingly, the image information from the CCD is taken-in after the canceling of the consecutive photographing mode, whereby the amount of defocusing of the AF operation is calculated.

AF process routine is shown in FIG. 9. The amount and the direction of defocusing are calculated by processing the image information received from the CCD in AF detection unit 2 via AF data bus AFD in the step #100. The focus condition of the lens is judged in the step #101. In case the defocus amount is beyond a predetermined value, it is judged as a defocus condition and the program goes to the AF motor control routine beginning from the step #112. In case the defocusing amount is below the aforementioned predetermined value, it is judged as an in-focus condition and the program goes to the in-focus process routine beginning from the step #102.

In the step #102, the in-focus display is executed by a buzzer provided in the in-focus display unit IFD in FIG. 1 or a light emitting diode LED in the finder. In the next step #103 the in-focus zone flag is set "1" in order to memorize the in-focus condition. In the step #104 the signal control line $\overline{\text{RELEN}}$ connected to the output terminal P13 is changed from H level to L level in order to permit a release interruption by the release switch SW2. When the release switch SW2 is turned on, the interruption takes place and the program goes to the release process routine after the step #60 as shown in FIG. 6.

Subsequent, with the photographic lens held in the in-focus condition, the condition of the light measurement switch SW1 is judged in the step #105, and in case the switch SW1 is on, after executing the light measurement routine again in the step #106, the program rounds the loop returning to the step #105 and wait for the interruption by the release switch SW2. On the other hand, in case the light measurement switch SW1 is off, the program goes to the step #107 from the step #105 and the in-focus display is turned off, and after the in-focus zone flag is reset to "0" in the step #108, the program jumps to the step #17 in FIG. 6 after the step #107.

Next, AF motor control routine after the step #112 is explained.

First, the defocus amount calculated in the step #100 is converted to a pulse train having the number $N_1$ on the basis of the lens shifting conversion factor read from the lens in the step #112. The aforementioned pulse number $N_1$ is compared with a predetermined reference pulse number $N_0$ in the steps #113 and #114, and in case of $N_1 \geq N_0$ it is judged that the defocus amount is comparatively large and the program goes to the FAR zone process routine beginning from the step #140, while in case of $N_1 < N_0$ it is judged that the defocus amount is comparatively small and the program goes to the NEAR zone process routine beginning from the step #115.

In the step #140 a pulse counter in CPU 1 is started after the value of $N_1-N_0$ is set in the counter. In the step #141, the AFMF flag for memorizing that the AF motor $M_2$ is driven in FAR zone is set "1". In the step #142 an interruption by the counter is enabled, and in the step #143 the AF motor $M_2$ is driven continuously to shift the photographic lens in a high speed toward the in-focus position on the basis of the defocus direction calculated in the step #100. Then the control signal lines CMD0 to CMD3 from CPU 1 to the driver controller 8 are changed to H, H, H, L levels or H, H, L, H levels, respectively, depending on the defocus direction. After the AF priority flag is reset to "0" in the step #144, the program goes round the loop of the judgement of the condition of the light measurement switch SW1 and the light measurement routine formed by the steps #145 and #146. This loop is different from the loop of the aforementioned steps #105 and #106 since the program waits for a counter interruption by the end of the AF drive of the lens by the AF motor $M_2$ When the photographic lens is shifted by the AF motor $M_2$ and the predetermined number $N_1-N_0$ of the pulse train fed from the AF encoder 82 to the CNTR terminal of CPU 1 is counted by the pulse counter, the counter interruption takes place and the program goes to the pulse counter interruption routine after the step #150 shown in FIG. 10.

CPU 1 judges at the step #150 whether the camera is effecting the camera releasing operation or AF operation. In case the AFMF flag or AFMN flag has been set to "1", it is judged that the camera is effecting the AF operation, and the program goes to an AF motor pulse interruption routine beginning from the step #160. In this case since the photographic lens is in the FAR zone, the program goes to the step #171 from the step #160 and AFMF flag is reset to "0" in the step #171. In the step #172 the reference pulse number $N_0$ is set in the pulse counter, and in the step #173 the counter is started, while in the step #174 the counter interruption is enabled. In the step #175 the stack pointer is reset, which is necessary for returning from the counter interruption routine to the former routine. Accordingly, the program does not go back to the former routine from the interruption process routine but jumps to the next routine, whereby in the step #176 the program jumps to the NEAR zone control routine beginning from the step #121.

Going back to the step #114 in FIG. 9, in case of $N_1 < N_0$, it is judged that the defocus amount is comparatively small, then the program goes to the NEAR zone process routine after the step #116. This routine is different from the FAR zone process routine after the step #140. That is, the AF motor $M_2$ is driven at a low speed by intermittent pulses in order to prevent the lens from overrunning the destination to be stopped and the light measurement routine is not called at all. This is partly because the defocus amount is small and partly because the lens can reach the in-focus position is a short time and further partly because the process in CPU 1 can be simplified.

After the pulse number $N_1$ is set in the pulse counter in the step #116, the counter is started in the step #117. The counter interruption is enabled in the step #118 and the AFMN flag for memorizing the NEAR zone drive is set to "1" in the step #121. In the next step #122 the AF motor $M_2$ is driven but after waiting for a predetermined time interval $\Delta T_{10}$ in the step #123, the AF motor $M_2$ is turned off in the step #124 and is simultaneously applied with the brake in the step #125. In the step #126, the brake of the lens driving motor $M_2$ is released after the predetermined time interval $\Delta T_{11}$. Then in the step #128 the state of the light measurement switch SW1 is judged, and in case of on state, the program goes back to the step #122 and continues to round the loop of the steps #122 to #128.

Figure 10:
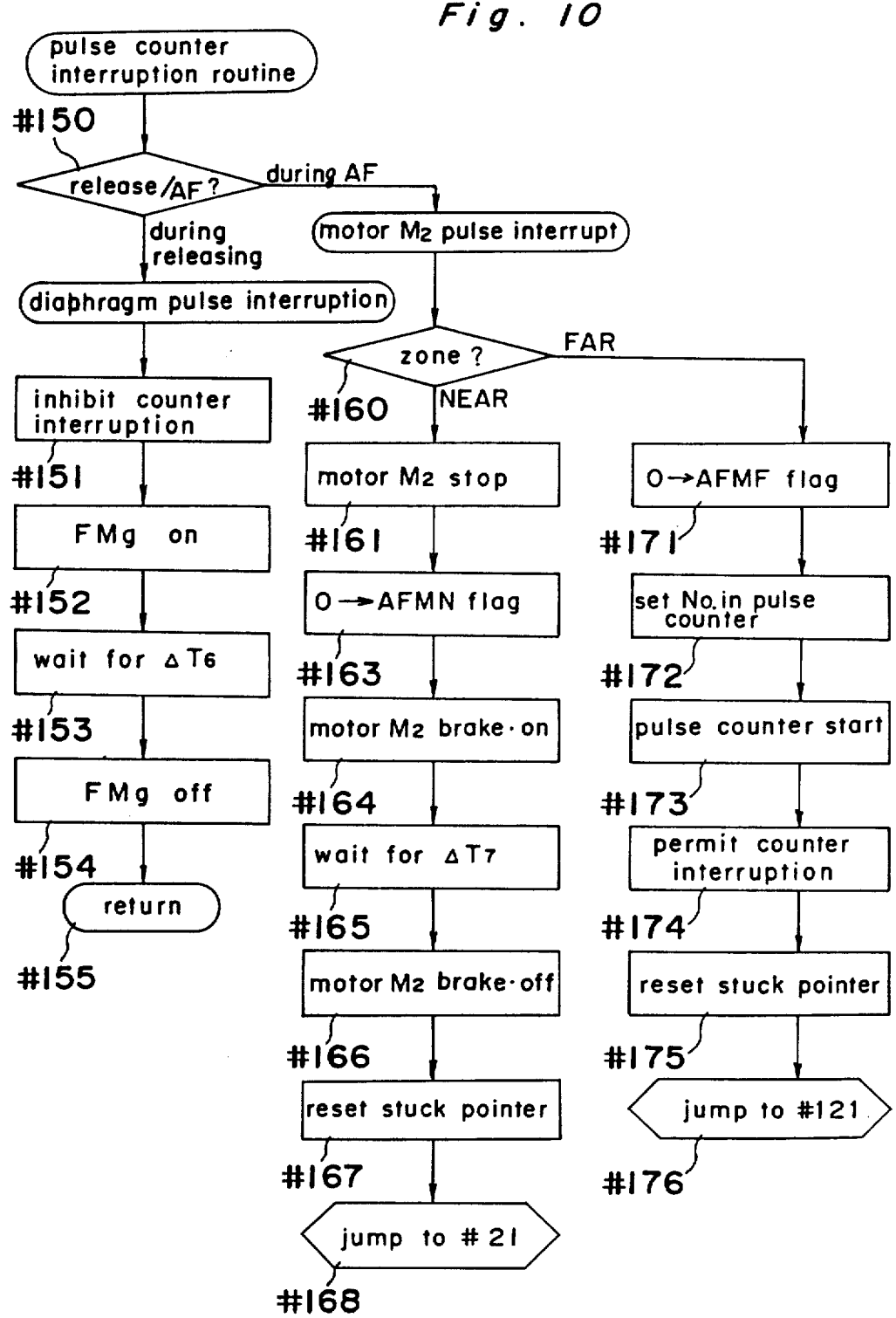
Figure 11:
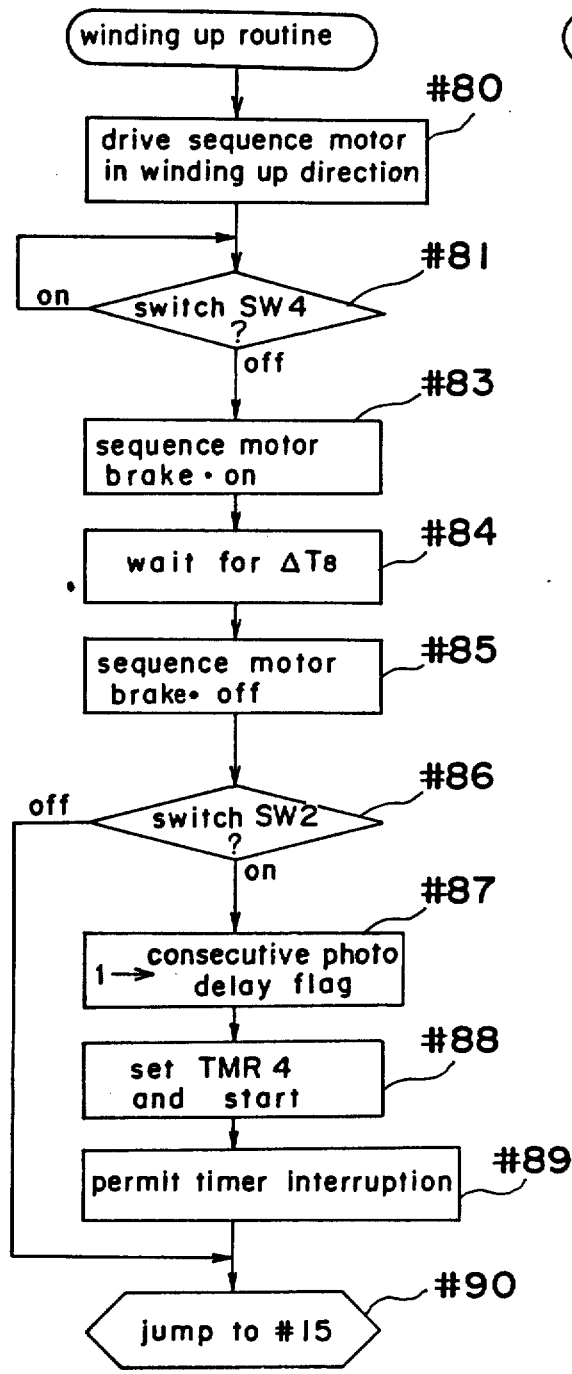

During the above mentioned process the number of the pulses generated from the AF encoder 82 by the intermittent driving of the lens driving motor $M_2$ is counted by the pulse counter, and when the count value becomes $N_1$, a counter interruption takes place in CPU 1 and the program goes to the pulse counter interruption routine as shown in FIG. 10.

Thus, the loop of the steps #122 to #128 and in the loop of the steps #145 to #146 are interrupted when the shift of the lens by the lens driving motor $M_2$ is finished and the program goes to the other step. This is necessary because the time interval necessary for shifting the lens is changed in dependence upon the defocus amount and the lens torque, so that the time interval control of the driving routine of the lens driving motor $M_2$ becomes difficult, resulting in difficulty in effective use of CPU 1.

In this case the AFMN flag has been set, and therefore the program goes to the step #150 →#160 →#161 in FIG. 10 and the lens driving motor $M_2$ is stopped. In the next step #163 the AFMN flag is reset to "0". In the step #164 the lens driving motor $M_2$ is braked and after waiting for a predetermined time interval $\Delta_7$ in the step #165 the lens driving motor $M_2$ is released from the brake in the step #166. In the step #167 the stuck pointer is reset and in the step #168 the program jumps to the step #21 in FIG. 6 to start charge accumulation in the CCD and goes round the light measurement routine of the step #27 again. At this time, since the AF priority flag has been reset to "0", the operation mode of the camera is turned to the light measurement priority mode and after the program goes round the light measurement loop one time. CPU 1 is allowed to take-in the image information from CCD. This is because the light measurement calculation is omitted in the NEAR zone control routine in FIG. 9.

In the AF process routine in FIG. 9, in case the light measurement switch SW1 is turned off during the driving of the lens driving motor $M_2$, the program goes to the step #130 from the step #128 or the step #145 and the lens driving motor $M_2$ is stopped, and in the step #131 the counter interruption is inhibited. In the step #132 both of AFMF and AFMN flags memorizing that the lens driving motor $M_2$ is in driving, are reset to "0" and in the step #133 the program jumps to the step #17 in FIG. 6 and goes to the light measurement or AF routine.

Going back to FIG. 9, in case the release switch SW2 is turned on, after the lens is set in the in-focus position by the AF operation, the release interruption takes place since the release interruption is enabled in the step #104, and the program goes back to the starting routine in FIG. 6, wherein the steps #10, #40, #41 are executed in order and the program goes to the release process routine.

First in the step #41 interruptions other than the counter interruption are disabled and in the step #60 the focusing zone flag set in the AF routine is reset to "0", and in the step #61 the command of stopping the light measurement is transmitted to the light measurement unit 6 via the serial data bus SRD. In the next steps #62 and #63 the control signal lines CMD0 to CMD3 are respectively changed to H, L, H and L levels for the driver controller 8, thereby the electro-magnets 1CMG and 2CMG of the leading shutter curtain and trailing shutter curtain are held and thereafter the mirror up command is transmitted to the driver controller so that the sequence motor $M_1$ is rotated forward to cause the mirror drive mechanism to lift up the reflex mirror. In the step #64 the aperture value Av calculated in the exposure calculation routine is converted to the aperture diaphragm step number according to the minimum F number of the attached lens, and in the step #65 the converted value is set in the pulse counter in CPU 1. In the step #66 the counter interruption is enabled. In the step #67 the state of the switch SW3 for detecting the mirror-up is judged and the program stays in the step #67 till the switch SW3 is turned on by finishing the mirror-up. During this process the pulse generated from the diaphragm encoder 81 is being applied to the CNTR terminal of CPU 1 from the driver controller 8, and when the number of pulses counted by a counter in the CPU 1 becomes equal to the corresponding value of the diaphragm step number set in the step #65, the counter interruption takes place and the program proceeds to the counter interruption process routine beginning from the step #150 shown in FIG. 10.

In the step #150 it is judged which of the camera release operation and AF operation is now performed. In this case since the camera release operation is performed, the diaphragm interruption process program beginning from the step #151 is executed. In the step #151 the counter interruption is disabled, and in the step #152 the control signal lines CMD0-CMD3 to the driver controller 8 are respectively changed to H, L, H and L levels, whereby the electro-magnet FMG for arresting the diaphragm is energized and the diaphragm operating lever is arrested to set the diaphragm aperture. After waiting for the time period $\Delta T_6$ in the step #153, the control signal lines CMD0-CMD3 are respectively changed to H, L, L and H levels, whereby the electro-magnet FMG for arresting the diaphragm operating lever is de-energized in the step #154. Subsequently, the program goes back to the step #67 of the camera release process routine in FIG. 6 in response to a return command produced in the step #155.

In the step #67 when the switch SW3 is turned on by finishing of the mirror-up, the program goes to the step #69 and the control signal lines CMD0 to CMD3 are respectively changed to H, L, L, L levels, thereby the brake for the sequence motor $M_1$ is turned on. After waiting for the time period $\Delta T_4$ in the step #70, the control signal lines CMD0 to CMD3 are respectively changed to L, H, H and H levels, whereby the brake for the sequence motor $M_1$ is turned off Furthermore, in the step #72 the electro-magnet 1CMG is de-energized, whereby the leading shutter curtain is released and starts moving. In the step #74 when the time period corresponding to the shutter speed Tv calculated in the exposure calculation routine has lapsed from the releasing of the leading shutter curtain, the control signal lines CMD0 to CMD3 are respectively changed to H, H, H and H levels in the step #75, whereby the electro-magnet 2CMG is de-energized and the leading shutter curtain is released to move. Thus the shutter is opened for the time period corresponding to the shutter speed Tv. After finishing the release process program in the steps #60 to #75, the stuck point is reset in the step #76, and in the step #77 the program jumps to the step #80 of the film winding process routine in FIG. 11.

In the step #80 the control signal lines CMD0 to CMD3 to the driver controller 8 are respectively changed to L, H, H and L levels, whereby the sequence motor $M_1$ is driven in reverse direction for the winding up the film. When in the step #81 the switch SW4 for detecting the film winding is turned off by finishing the film winding by the length of one picture frame, the program goes to the step #83 and the control signal lines CMD0 to CMD3 are respectively changed to L, H, L and H levels, whereby the sequence motor $M_1$ is braked. After waiting for the time period $\Delta T_8$ in the step #84, the control signal lines CMD0 to CMD3 are respectively changed to H, H, H and H levels, whereby the brake for the sequence motor $M_1$ is turned off in the step #85. In the step #86 the state of the release switch SW2 is judged, and in case of "off" of the switch SW2, the program jumps to the step #15 of the light measurement process routine shown in FIG. 6 in the step #90, but in case of still "on" of the switch SW2, the program goes to the camera release operation and the next photographing is executed immediately when the light measurement and focus detection are finished.

In the present embodiment, the camera release operation is inhibited for the predetermined time period $\Delta T_9$ from the time of finishing the film winding operation (see the step #85) even if the light measurement and focus detection have been finished, whereby the consecutive photographing which is against the intention of the camera operator can be prevented.

Figure 12:
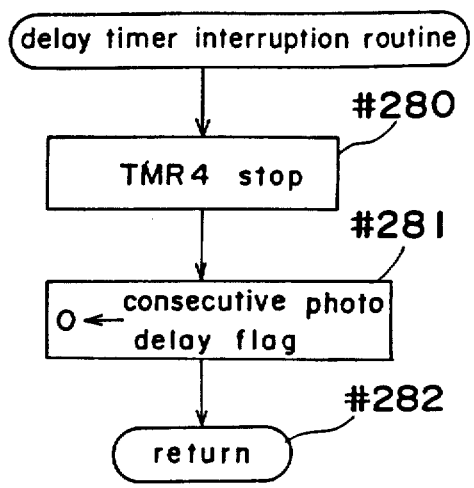

That is, the consecutive photographing delay flag is set to "1" in the step #87. This flag is used for judging whether the camera release operation has been enabled in the light measurement routine after finishing the film winding. In the next step #88, a timer TMR4 is set the time period $\Delta T_9$ and started. In the step #89 the interruption which takes place after $\Delta T_9$ from the time of the starting of the timer TMR4 is enabled. Then the program goes to the light measurement process routine of the step #15 in the step #90. When the interruption of the timer TMR4 takes place in the light measurement loop after the finishing of the film winding by the length of one picture frame, the timer interruption routine of the consecutive photographing beginning from the step #280 shown in FIG. 12 is executed.

The timer TMR4 is stopped in the step #280, and the aforementioned consecutive photographing delay flag is reset to "0", and the program returns to the first routine in the step #282.

Thus, in case the release switch SW2 is kept in the on state after the finishing of the film winding, the subsequent camera release is started after the period of $\Delta T_9$, so that any of the single photographing mode or the consecutive photographing mode can be selected in accordance with the operator's will.

As described above, in case the destination of the data communication of CPU 1 is a circuit inside the camera body, the clock frequency $\phi_1$ of the serial data is selected, so that the data is transmitted in a high speed. On the other hand, in case the destination of the data communication of CPU 1 is a circuit connected to the camera via the electrical contacts, the clock frequency $\phi_2$ slower than the clock frequency $\phi_1$ is selected, so that the correct data can be transmitted by slowing the transmission speed.

In the aforementioned embodiment, though the clock frequency of the serial data is changed depending on whether the destination of the data communication of CPU 1 is a circuit inside or outside the camera body, this may be modified according to the kind of the process whether the destination circuit arrangement is formed by bipolar transistors or CMOS transistors or according to whether the controller of the destination is a hardware or software, or by a suitable combination of these conditions.

What is claimed:

1. A data transmission system for use in a camera which comprises:
    a central processing unit (CPU) for controlling operation of said camera and communicating with a plurality of circuit arrangements coupled to said CPU using serial data signal under control of a clock;
    an internal circuit arrangement provided in said camera for communicating with said CPU using the serial data signal; and
    an external circuit arrangement provided outside the camera for communicating with said CPU using said serial data signal,
    said CPU selecting the frequency of the clock corresponding to which of the internal circuit arrangement and external circuit arrangement communicates a with said CPU.

2. The data transmission system according to claim 1, wherein the frequency of the clock is slow when the destination is said external circuit arrangement.

3. The data transmission system according to claim 1, wherein said internal circuit arrangement is a display circuit.

4. The data transmission system according to claim 1, wherein said internal circuit arrangement is a light measurement circuit.

5. The data transmission system according to claim 1, wherein said internal circuit arrangement is a film sensitivity reading circuit.

6. The data transmission system according to claim 1, wherein said external circuit arrangement is a circuit provided in an interchangeable lens attached to said camera.

7. The data transmission system according to claim 1, wherein said external circuit arrangement is a circuit provided in a flash device attached to said camera.

8. A photographic system comprising:
    a camera;
    selection means, arranged in said camera, for selecting one of a plurality of communication destinations, and for generating a destination selection signal indicative of which of said plurality of communication destinations is selected;
    clock generating means, arranged in said camera, for generating clock signals having different frequencies;
    clock selection means, arranged in said camera and response to said selection means, for selecting one of said clock signals in accordance with said destination selection signal; and
    data communicating means, arranged in said camera and responsive to said clock generating means, for communicating with the selected communication destination at a rate determined by the frequency of the selected clock signal.

9. A photographic system as claimed in claim 8, wherein said clock selection means selects a high speed clock signal when the selected destination is situated in the camera.

10. A photographic system as claimed in claim 8, further comprising a peripheral device electrically connected to said camera, wherein said plurality of communication destinations includes a destination in said peripheral device, and wherein said clock selection means selects a clock signal having a slow frequency in response to a condition in which said selection means selects said communication destination in said peripheral device.

11. A data transmission system comprising:
selection means for generating signals for selecting a communication destination;
clock generating means for generating clock signals having different frequencies;
clock selection means for designating the frequency of the clock signal depending on whether the destination is composed of bipolar transistors or CMOS transistors; and
data communicating means for communicating with said selected destination using a data signal having a serial form at a rate corresponding to said selected clock signal.

12. A data transmission system comprising:
selection means for generating signals for selecting a communication destination;
clock generating means for generating clock signals having different frequencies;
clock selection means for designating a first frequency of the clock signal when the selected destination is formed by a logic circuit and a second frequency when said selected destination comprises a microcomputer; and
data communicating means for communicating with said selected destination using a data signal having a serial form at a rate corresponding to said selected clock signal.

* * * * *